US008046192B2

(12) United States Patent
McClain et al.

(10) Patent No.: US 8,046,192 B2
(45) Date of Patent: Oct. 25, 2011

(54) BALER MACHINE MONITORING AND PERFORMANCE INTERFACES, SYSTEMS AND METHODS

(75) Inventors: Stephen B. McClain, St. Charles, MO (US); Rick Byers, Florissant, MO (US); James J. Schuster, Olathe, KS (US)

(73) Assignee: Smurfit-Stone Container Enterprises, Inc., Chicago, IL (US)

( * ) Notice: Subject to any disclaimer, the term of this patent is extended or adjusted under 35 U.S.C. 154(b) by 125 days.

(21) Appl. No.: 12/174,440

(22) Filed: Jul. 16, 2008

(65) Prior Publication Data

US 2009/0222240 A1 Sep. 3, 2009

Related U.S. Application Data

(60) Provisional application No. 61/032,664, filed on Feb. 29, 2008.

(51) Int. Cl.
*G06F 11/30* (2006.01)

(52) U.S. Cl. ......................... 702/182; 702/187; 702/189

(58) Field of Classification Search .................. 702/182, 702/187–189; 700/90, 95, 213, 258; 56/474
See application file for complete search history.

(56) References Cited

U.S. PATENT DOCUMENTS

| | | | | |
|---|---|---|---|---|
| 4,630,191 | A | 12/1986 | Strosser | |
| 4,674,403 | A * | 6/1987 | Bryant et al. | 100/4 |
| 4,951,452 | A * | 8/1990 | Lundahl et al. | 56/341 |
| 5,239,919 | A | 8/1993 | Maki et al. | |
| 5,730,037 | A * | 3/1998 | Manning | 82/118 |
| 6,360,186 | B1 | 3/2002 | Durbin | |
| 6,687,656 | B2 | 2/2004 | Durbin et al. | |
| 6,856,847 | B2 | 2/2005 | Kao et al. | |
| 7,124,059 | B2 | 10/2006 | Wetzer et al. | |
| 2003/0110142 | A1 * | 6/2003 | Sesek et al. | 705/404 |
| 2004/0049369 | A1 | 3/2004 | Konicek et al. | |

* cited by examiner

*Primary Examiner* — Mohamed Charioui
*Assistant Examiner* — Elias Desta
(74) *Attorney, Agent, or Firm* — Armstrong Teasdale LLP

(57) ABSTRACT

Monitoring and performance interfaces are disclosed for baler machines. The interfaces collect and analyze runtime and downtime data and present reports or varying detail to interested personnel that allow objective assessment of baler machine performance. Multiple baler machines may be monitored and analyzed to reveal human and machine-related issues that inhibit optimal performance but are otherwise extremely difficult to detect.

39 Claims, 22 Drawing Sheets

Materials Screen

250

| Material (Materiales): | | | |
|---|---|---|---|
| OCC normal (OCC normal) | OCC premium (OCC prima) | #8 news (#8 noticias) | #6 news (#6 noticias) |
| Overissue news (Noticias overiss) | Wht news blank (Periódico blanco) | Magazines (Revista) | Office fiber (Fibra de oficina) |
| Coated book (Cubrió el libro) | CPO (CPO) | Mixed paper (Papel mezclado) | Soft white (Ligero blanco) |
| Sorted wht ledger (Contabilid blanco) | Hard white (Duro blanco) | Hallmark ledger (Contabilid hallmk) | Plate waste (Pesecho) |
| Hard mix (Combinación dura) | Box cuts (Corte caja) | IGS coated (IGS cubrimientos) | Unprt plate stock (Unprt plate stock) |
| Lt printed bleach (Lt printed bleach) | Plastic (Plástico) | UBC (UBC) | Miscellaneous (Diverso) |

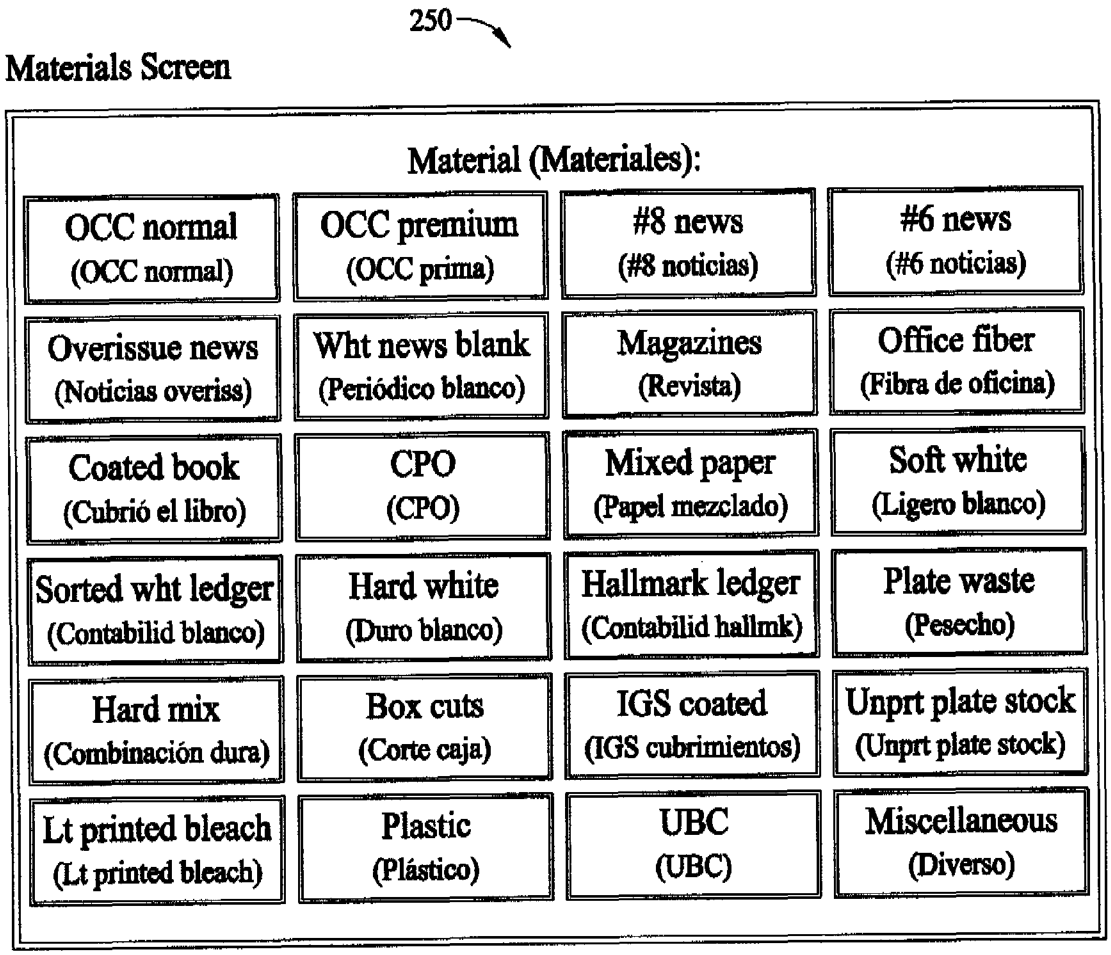

| Plant Information | | | Production Summary | | | | | | | | | | |
|---|---|---|---|---|---|---|---|---|---|---|---|---|---|
| 328 | 330 | 332 | 334 | 336 | 338 | 340 | 342 | 344 | 346 | 348 | 350 | 352 | 354 |
| Plant Name | Region | Baler Type | Total Scheduled Hours | Total DT % Sched HRS | Total Actual Tons/Sched HRS | Tons/ Sched HRS Baseline | Deviation from Baseline | Total Actual Tons/ Prod HRS | Actual OCC/Prod HRS | Optimal OCC/ Prod HRS | OCC Deviation | Actual News/ Prod HRS | Optimal News/ Prod HRS |
| Augusta | Southeast | HRB | 216.65 | 28% | 7.12 | 6.32 | 0.80 | 9.89 | 10.22 | 9.41 | 0.81 | 13.88 | - |
| Kansas City | East | HRB | 167.04 | 45% | 19.08 | 14.90 | 4.18 | 34.87 | 23.00 | - | 23.00 | 37.92 | 20.79 |
| Kansas City | East | LIN | 195.91 | 55% | 6.42 | 7.51 | (1.08) | 14.18 | 15.56 | 9.87 | 5.69 | - | - |
| Evansville | East | HRB | 177.69 | 25% | 9.15 | 7.04 | 2.11 | 12.27 | 11.55 | 11.60 | (0.05) | 14.99 | 16.15 |
| St. Louis | East | LIN | 376.36 | 25% | 12.73 | 14.94 | (2.21) | 16.90 | 16.95 | 22.50 | (5.55) | 17.14 | 21.00 |
| St. Louis | East | BOL | 381.25 | 20% | 15.11 | 16.14 | (1.03) | 18.98 | 17.06 | 20.16 | (3.10) | 23.33 | 27.50 |
| Louisville | Southeast | IPS | 289.26 | 36% | 11.11 | 10.56 | 0.55 | 17.30 | 15.18 | 13.75 | 1.43 | 32.85 | 18.20 |
| Anchorage | West | HRB | 180.61 | 35% | 8.27 | 6.68 | 1.59 | 12.69 | 10.53 | 8.68 | 1.85 | 19.97 | 13.94 |
| Seattle | West | BOL | 507.36 | 30% | 18.71 | 16.22 | 2.49 | 26.71 | 24.52 | 24.05 | 0.47 | 34.71 | 42.75 |
| Sacramento East | West | LOG-E | 359.51 | 31% | 11.08 | 9.24 | 1.83 | 16.08 | 16.16 | 15.30 | 0.86 | 26.21 | 21.90 |
| Sacramento West | West | LOG-W | 249.51 | 19% | 6.69 | 6.68 | 0.01 | 8.24 | 9.53 | 10.89 | (1.36) | 13.22 | 15.94 |
| Oakland | West | BOL | 375.56 | 24% | 23.23 | 22.22 | 1.00 | 30.65 | 23.21 | 15.30 | 7.91 | 36.37 | 22.23 |
| San Jose | West | BOL | 310.47 | 30% | 21.42 | 22.08 | (0.66) | 30.41 | 22.75 | 23.74 | (0.99) | 36.90 | 36.43 |
| Fresno | West | LOG | 181.49 | 41% | 7.24 | 6.61 | 0.64 | 12.25 | 12.07 | 10.50 | 1.57 | 15.84 | 17.10 |
| Portland East | West | HRB | 299.75 | 27% | 14.82 | 12.72 | 2.10 | 20.33 | 17.50 | 15.66 | 1.84 | 26.77 | 31.34 |
| Nashville | Southeast | IPS | 187.93 | 55% | 11.26 | 10.55 | 0.71 | 24.77 | 23.93 | 19.64 | 4.29 | - | - |
| Nashville | Southeast | AMER | 170.38 | 28% | 9.00 | 7.90 | 1.10 | 12.57 | 5.96 | 15.93 | (9.97) | 12.45 | - |
| Jacksonville | Southeast | IPS | 273.47 | 43% | 10.74 | 10.39 | 0.35 | 18.68 | 17.18 | 15.18 | 2.00 | 16.07 | - |
| Ft. Lauderdale | Southeast | HRB | 44.49 | 24% | 41.39 | 8.44 | 32.95 | 54.22 | 461.96 | 9.55 | 452.41 | 54.98 | 22.50 |
| Ft. Lauderdale | Southeast | IPS | 173.13 | 23% | 12.06 | 10.44 | 1.62 | 15.67 | 7.95 | - | 7.95 | 16.35 | 18.80 |
| Bakersfield | West | LOG | 201.01 | 42% | 6.13 | 7.33 | (1.20) | 10.51 | 8.50 | 9.47 | (0.97) | 18.61 | 25.84 |
| Philly | East | AMER | 179.75 | 29% | 8.52 | 6.80 | 1.71 | 12.01 | - | - | - | 12.01 | 13.13 |
| Torrance | West | BOL | 476.33 | 31% | 18.61 | 14.10 | 4.51 | 26.78 | 23.40 | 18.00 | 5.40 | 51.10 | 58.30 |
| Tampa | Southeast | HRB | 178.13 | 59% | 13.56 | 7.76 | 5.80 | 32.83 | 27.65 | 12.70 | 14.95 | #DIV/0! | - |
| Tampa | Southeast | HRB8 | 220.13 | 39% | 9.30 | 7.89 | 1.41 | 15.22 | 13.43 | 20.75 | (7.32) | 18.04 | - |
| Columbus | East | MAC | 281.08 | 53% | 15.73 | 13.86 | 1.86 | 33.80 | 27.34 | 21.58 | 5.76 | 48.60 | 46.80 |
| St. Charles | East | IPS | 297.72 | 42% | 11.03 | 11.38 | (0.35) | 19.09 | 15.47 | 15.80 | (0.33) | 34.60 | 32.73 |
| Southside | East | LOG | 263.60 | 27% | 8.55 | 9.04 | (0.49) | 11.70 | 8.38 | 8.50 | (0.12) | 15.53 | 12.95 |
| **No Data Found for:** | | | | | | | | | | | | | |

| Plant Information (322) | | | 356 (324) | Downtime Detail Summary (326) | | | | | | | | | | | |
|---|---|---|---|---|---|---|---|---|---|---|---|---|---|---|---|
| | | | | 358 | 360 | 362 | 364 | 366 | 368 | 370 | 372 | 374 | | 376 | 378 |
| Plant Name | Region | Baler Type | News Deviation | Break | Lunch | Meeting | Baler Mech-anical | Baler Elect-rical | Baler Hydr-aulic | Wire Feed Problems | Wire Tying Problems | Wire change | Conv-eyor 01 Mech-anical | Conv-eyor 01 Elect-rical | Conv-eyor 02 Mech-anical (380) |
| Augusta | Southeast | HRB | 13.88 | 16.77 | 1.50 | 2.75 | 11.36 | 0.05 | 2.00 | 5.34 | 0.71 | - | 4.12 | - | - |
| Kansas City | East | HRB | 17.13 | 9.85 | - | 4.31 | 0.68 | - | 0.36 | 4.83 | 0.84 | 0.74 | 0.13 | 0.08 | - |
| Kansas City | East | LIN | - | 12.74 | 0.75 | 8.06 | 0.54 | 0.17 | 0.75 | 0.02 | 1.62 | 0.60 | 0.54 | 0.19 | - |
| Evansville | East | HRB | (1.16) | 20.72 | - | 1.28 | 0.00 | - | - | 2.08 | 0.14 | 0.52 | 0.18 | 0.01 | - |
| St. Louis | East | LIN | (3.86) | 21.00 | 20.50 | 13.50 | 3.50 | - | 2.06 | 0.52 | 2.72 | 1.48 | 0.09 | - | - |
| St. Louis | East | BOL | (4.17) | 21.00 | 21.00 | 10.50 | - | - | - | 0.50 | 2.13 | - | - | - | - |
| Louisville | Southeast | IPS | 14.65 | 31.40 | 18.64 | 0.66 | 0.32 | 2.25 | - | 1.25 | 0.07 | 0.31 | - | - | - |
| Anchorage | West | HRB | 6.03 | 25.58 | - | 2.93 | 0.23 | 0.01 | 3.65 | 0.85 | 0.08 | 0.22 | 0.02 | - | - |
| Seattle | West | BOL | (8.04) | - | 47.25 | 1.00 | 13.56 | - | - | - | 13.15 | 5.53 | 5.50 | - | - |
| Sacramento East | West | LOG-E | 4.31 | 3.54 | - | 0.98 | 2.63 | 0.43 | 0.03 | 21.30 | 27.53 | 0.69 | 5.28 | - | - |
| Sacramento West | West | LOG-W | (2.72) | 1.75 | - | 10.20 | - | 1.33 | 0.50 | 0.40 | 0.90 | 0.50 | 2.95 | - | - |
| Oakland | West | BOL | 14.15 | 12.50 | 12.00 | 8.33 | 14.96 | - | - | 0.25 | 10.56 | 0.84 | - | - | - |
| San Jose | West | BOL | 0.47 | 8.28 | 4.25 | 7.15 | 0.58 | 3.00 | 2.83 | 2.61 | 7.06 | 3.08 | 1.00 | - | - |
| Fresno | West | LOG | (1.26) | 14.88 | 3.50 | 3.38 | 0.17 | 0.02 | - | 8.93 | 1.59 | 1.33 | 2.27 | - | - |
| Portland East | West | HRB | (4.57) | 43.66 | - | - | 0.02 | 0.47 | 0.02 | 2.88 | 0.42 | 0.60 | 0.17 | - | - |
| Nashville | Southeast | IPS | - | 2.60 | 0.90 | - | 0.03 | 0.11 | 1.62 | 0.02 | 3.06 | 0.63 | - | 0.36 | - |
| Nashville | Southeast | AMER | 12.45 | 12.13 | 9.00 | 1.60 | 5.67 | 0.01 | - | - | 1.51 | 0.34 | 0.05 | - | - |
| Jacksonville | Southeast | IPS | 16.07 | 5.69 | 12.26 | 0.33 | 14.83 | 0.99 | 0.14 | 3.47 | 12.66 | 0.39 | 0.26 | - | 1.62 |
| Ft. Lauderdale | Southeast | HRB | 32.48 | 0.91 | 0.67 | 0.52 | 0.11 | 0.03 | - | 1.46 | - | 0.01 | - | - | - |
| Ft. Lauderdale | Southeast | IPS | (2.45) | 9.24 | 4.14 | 0.84 | 2.75 | - | 0.31 | 0.15 | 13.60 | 0.48 | - | - | 0.75 |
| Bakersfield | West | LOG | (7.23) | 12.15 | 8.82 | 8.95 | 7.50 | - | - | 0.13 | 2.29 | 0.40 | - | - | - |
| Philly | East | AMER | (1.12) | 6.00 | 10.25 | 0.50 | 0.75 | 0.50 | - | 4.75 | 2.50 | 1.00 | - | - | - |
| Torrance | West | BOL | (7.20) | 30.00 | 30.00 | 15.50 | - | 6.18 | - | 0.48 | 3.42 | 9.09 | 1.53 | - | - |
| Tampa | Southeast | HRB | #DIV/0! | 26.83 | 10.40 | 1.24 | 2.29 | 5.71 | 0.20 | 15.75 | 1.49 | 1.38 | 0.09 | 0.06 | - |
| Tampa | Southeast | HRB8 | 18.04 | 5.51 | - | 0.33 | 18.86 | 0.70 | 0.30 | 10.18 | 0.15 | 0.64 | 3.77 | 0.06 | - |
| Columbus | East | MAC | 1.80 | 10.40 | 7.07 | 0.65 | 0.18 | 1.22 | 1.99 | 1.28 | - | 0.82 | 0.03 | - | - |
| St. Charles | East | IPS | 1.87 | 0.81 | 0.54 | - | 1.35 | 3.12 | 1.63 | 9.93 | 9.30 | 0.32 | - | - | - |
| Southside | East | LOG | 2.58 | 5.76 | 0.50 | 32.32 | 8.21 | 0.09 | - | 10.30 | 3.01 | 0.22 | 1.55 | - | - |
| **No Data Found for:** | | | | | | | | | | | | | | | |

FIG. 17B

320 Plant Information 382 384 386 388 390 392 394 Downtime Detail Summary 396 398 400 402 404 406

| Plant Name | Region | Baler Type | Conv-eyor 02 Electrical | N/A | Gatherer Over-charge | Warm Up Time | No Material to Baler | Paper Grade Change Time | Paper Jam on Conv-eyor | Paper Jam in Hopper | Paper Jam at Knives | Clean Up Time | Daily PM/ Main-tenance | Weekly PM/ Main-tenance | Monthly PM/ Main-tenance |
|---|---|---|---|---|---|---|---|---|---|---|---|---|---|---|---|
| Augusta | Southeast | HRB | - | - | - | 0.25 | 4.02 | 2.36 | 0.83 | 0.48 | 7.02 | 0.58 | - | - | - |
| Kansas City | East | HRB | - | - | - | - | 17.81 | - | 22.07 | 1.99 | 1.07 | 8.15 | 2.76 | - | - |
| Kansas City | East | LIN | - | - | - | - | 11.15 | 0.26 | - | 65.77 | 0.18 | 2.32 | 1.49 | - | - |
| Evansville | East | HRB | - | - | - | - | 10.75 | 4.00 | 0.18 | 4.91 | 0.30 | 0.11 | 0.02 | - | - |
| St. Louis | East | LIN | - | - | - | 0.05 | 8.03 | 0.12 | 1.33 | 2.81 | 1.38 | 13.78 | - | - | - |
| St. Louis | East | BOL | - | - | - | - | 3.11 | 0.75 | 5.78 | 1.50 | 0.96 | 10.50 | - | - | - |
| Louisville | Southeast | IPS | - | - | - | 0.91 | - | - | - | 0.46 | 0.22 | - | - | - | - |
| Anchorage | West | HRB | - | - | - | 1.85 | 12.23 | 1.56 | 0.31 | 6.43 | 1.80 | 4.74 | 0.47 | - | - |
| Seattle | West | BOL | - | - | - | 1.33 | 0.25 | 15.22 | 1.74 | 0.49 | - | 40.55 | - | - | - |
| Sacramento East | West | LOG-E | - | - | - | 0.18 | 40.25 | 0.68 | 0.02 | 0.54 | 5.65 | 1.64 | 0.45 | - | - |
| Sacramento West | West | LOG-W | - | - | - | 0.13 | 6.83 | 9.34 | 0.12 | 2.33 | 0.86 | 2.32 | 0.59 | - | 5.75 |
| Oakland | West | BOL | - | - | - | - | 0.75 | - | - | - | 4.58 | 25.78 | - | - | - |
| San Jose | West | BOL | - | 0.70 | 0.50 | 4.42 | 9.60 | - | - | 6.21 | - | 9.69 | - | - | 14.00 |
| Fresno | West | LOG | - | - | 0.25 | 0.39 | 10.11 | 8.39 | 0.82 | 2.61 | 0.07 | 12.09 | 2.00 | - | - |
| Portland East | West | HRB | - | - | - | - | 18.07 | 9.90 | - | 3.31 | 0.61 | 0.54 | 0.59 | - | - |
| Nashville | Southeast | IPS | - | - | 14.41 | - | 0.64 | 4.08 | - | 0.15 | 6.95 | 20.10 | 17.24 | 3.15 | - |
| Nashville | Southeast | AMER | - | - | - | 0.23 | 8.07 | 3.78 | - | 0.26 | 2.47 | 3.30 | - | - | - |
| Jacksonville | Southeast | IPS | - | 0.00 | 7.81 | - | 0.04 | 1.90 | 0.01 | 1.02 | 16.92 | 0.02 | 2.21 | - | - |
| Ft. Lauderdale | Southeast | HRB | 0.05 | - | - | - | 0.80 | - | - | - | 0.18 | 0.33 | 0.82 | - | - |
| Ft. Lauderdale | Southeast | IPS | - | - | - | - | 0.34 | - | - | 4.25 | 2.96 | 9.99 | 1.75 | - | - |
| Bakersfield | West | LOG | - | - | 6.17 | - | 6.99 | 4.05 | 0.50 | 1.45 | 1.44 | - | 10.05 | 2.25 | - |
| Philly | East | AMER | - | - | - | 4.50 | 10.50 | - | - | 0.25 | 0.25 | 8.25 | 2.25 | - | - |
| Torrance | West | BOL | - | - | - | - | 2.33 | 4.55 | 0.23 | - | - | 31.63 | - | - | - |
| Tampa | Southeast | HRB | - | 5.47 | 0.14 | 12.04 | 0.23 | 0.34 | 0.05 | 1.33 | 5.67 | 0.54 | - | - | - |
| Tampa | Southeast | HRB8 | - | - | - | 0.08 | 14.66 | 0.10 | 0.01 | 0.74 | 1.08 | 1.40 | 0.08 | - | - |
| Columbus | East | MAC | - | - | - | - | - | 0.09 | - | 3.01 | 1.95 | 3.60 | 0.90 | 0.21 | - |
| St. Charles | East | IPS | - | - | 15.73 | - | 0.01 | - | - | - | - | 1.33 | 13.55 | - | - |
| Southside | East | LOG | - | - | - | 3.87 | 1.14 | 1.25 | 0.35 | - | 1.23 | 1.23 | 0.66 | - | - |

No Data Found for:

| Plant Information | | | 408 | | | | Downtime Categories 422 | | | | |
|---|---|---|---|---|---|---|---|---|---|---|---|
| | | | | 410 | 412 | 414 | 416 | 418 | 420 | 422 | 424 |
| Plant Name | Region | Baler Type | Quarterly PM/ Maintenance | Miscellaneous | Non-Accountable | Total | Conveyor | Baler | Wire Tier | Waiting to Bale | Total |
| Augusta | Southeast | HRB | - | - | - | **60.62** | 4.94 | 20.90 | 6.05 | 28.73 | **60.62** |
| Kansas City | East | HRB | - | - | (0.00) | **75.64** | 22.28 | 4.09 | 6.40 | 42.87 | **75.64** |
| Kansas City | East | LIN | - | - | (0.00) | **107.13** | 0.72 | 67.41 | 2.24 | 36.76 | **107.13** |
| Evansville | East | HRB | - | - | - | **45.22** | 0.37 | 5.22 | 2.75 | 36.89 | **45.22** |
| St. Louis | East | LIN | - | - | (0.00) | **92.87** | 1.42 | 9.75 | 4.73 | 76.98 | **92.87** |
| St. Louis | East | BOL | - | - | - | **77.73** | 5.78 | 2.46 | 2.63 | 66.86 | **77.73** |
| Louisville | Southeast | IPS | - | 2.65 | 43.78 | **102.90** | - | 3.25 | 1.62 | 98.03 | **102.90** |
| Anchorage | West | HRB | - | - | (0.00) | **62.96** | 0.32 | 12.12 | 1.16 | 49.37 | **62.96** |
| Seattle | West | BOL | - | 6.37 | (0.00) | **151.94** | 7.24 | 14.05 | 18.68 | ##### | **151.94** |
| Sacramento East | West | LOG-E | - | - | (0.00) | **111.81** | 5.30 | 9.27 | 49.53 | 47.71 | **111.81** |
| Sacramento West | West | LOG-W | - | - | 0.00 | **46.78** | 3.06 | 5.02 | 1.80 | 36.90 | **46.78** |
| Oakland | West | BOL | - | 0.42 | (0.00) | **90.97** | - | 19.54 | 11.65 | 59.78 | **90.97** |
| San Jose | West | BOL | - | 6.84 | (0.00) | **91.80** | 1.00 | 13.12 | 12.75 | 64.93 | **91.80** |
| Fresno | West | LOG | - | 1.35 | - | **74.16** | 3.09 | 3.11 | 11.85 | 56.10 | **74.16** |
| Portland East | West | HRB | - | - | - | **81.27** | 0.17 | 4.44 | 3.90 | 72.76 | **81.27** |
| Nashville | Southeast | IPS | - | 0.59 | 25.86 | **102.50** | 0.36 | 23.26 | 3.72 | 75.16 | **102.50** |
| Nashville | Southeast | AMER | - | - | 0.00 | **48.43** | 0.05 | 8.42 | 1.85 | 38.11 | **48.43** |
| Jacksonville | Southeast | IPS | 0.00 | 0.17 | 34.07 | **116.82** | 1.89 | 41.71 | 16.52 | 56.71 | **116.82** |
| Ft. Lauderdale | Southeast | HRB | - | 1.04 | 3.61 | **10.53** | 0.05 | 0.32 | 1.47 | 8.70 | **10.53** |
| Ft. Lauderdale | Southeast | IPS | - | 0.92 | (12.59) | **39.88** | 0.75 | 10.27 | 14.23 | 14.63 | **39.88** |
| Bakersfield | West | LOG | - | 10.67 | (0.00) | **83.82** | 0.50 | 16.56 | 2.82 | 63.94 | **83.82** |
| Philly | East | AMER | - | - | - | **52.25** | - | 1.75 | 8.25 | 42.25 | **52.25** |
| Torrance | West | BOL | - | 10.41 | (0.00) | **145.35** | 1.76 | 6.18 | 12.99 | ##### | **145.35** |
| Tampa | Southeast | HRB | - | 2.79 | 10.49 | **104.57** | 0.20 | 15.35 | 18.63 | 70.38 | **104.57** |
| Tampa | Southeast | HRB8 | - | 27.00 | - | **85.65** | 3.85 | 21.68 | 10.97 | 49.15 | **85.65** |
| Columbus | East | MAC | - | 2.22 | 114.38 | **150.02** | 0.03 | 8.36 | 2.10 | ##### | **150.02** |
| St. Charles | East | IPS | - | 0.60 | 67.35 | **125.55** | - | 21.82 | 19.55 | 84.19 | **125.55** |
| Southside | East | LOG | - | - | (0.75) | **70.95** | 1.89 | 9.53 | 13.65 | 45.99 | **70.95** |
| **No Data Found for:** | | | | | | | | | | | |

BALER MACHINE MONITORING AND PERFORMANCE INTERFACES, SYSTEMS AND METHODS

CROSS REFERENCE TO RELATED APPLICATIONS

This application claims the benefit of U.S. Provisional Application Ser. No. 61/032,664 filed Feb. 29, 2008, the complete disclosure of which is hereby incorporated by reference in its entirety.

BACKGROUND OF THE INVENTION

This invention relates generally to the monitoring of industrial equipment in operation, and more specifically to interfaces, systems and methods for monitoring performance of sorting and baling systems.

Compacting and baling loose solid waste materials into denser, more easily transported units, often referred to as bales, is common in refuse disposal and recycling and is used routinely, for example, at recycling centers, manufacturing facilities, and retail and wholesale stores to compress paper, textiles, metals, plastic, and other material. Equipment and machinery for producing the bales, often referred to as baler machines, are typically utilized to compress refuse material through the action of a powered ram that moves vertically or horizontally into and through a compression chamber. Using tons of pressure, the ram compresses the chamber contents into a relatively compact, dense bale of material, which is bound together using wire or twine, for example.

As recycling becomes more central to industrial and manufacturing processes, baling equipment plays an important role in efficient processing of recyclable materials. Effectively evaluating performance aspects of baler machines in use to achieve efficient and optimal operation of baler machines is challenging in a number of aspects and so far has been elusive.

BRIEF DESCRIPTION OF THE INVENTION

Among the various embodiments disclosed, a monitoring interface for evaluating a production performance of at least one baler machine is provided. The monitoring interface comprises at least one sensor device detecting a downtime condition of the baler machine, a controller interfaced with the at least one sensor device and recording data associated with detected downtime conditions, and an input device coupled to the controller and accepting user provided data inputs regarding runtime operation of the baler machine. The data inputs include at least a material type input, an acceptable bale input, and an unacceptable bale input. The controller is configured to communicate the recorded data and accepted data inputs to a computer-implemented performance interface for generation of a production report.

Optionally, the controller is configured to trigger an alarm condition in response to predetermined signals from the at least one sensor device. An alarm beacon may be activated by the controller in the alarm condition. The baler machine may be fed bale material by a conveyor, and the at least one sensor device may comprise one of a conveyor motor sensor and a conveyor eye sensor. The input device may comprise a touch sensitive display or a keyboard. Data inputs may be selected from the display, and may include at least one of an operator identification input, a shift input, a maintenance person input, and combinations thereof. The data inputs may comprise a material type input including one of an OCC type input, a paper input, a fiber input, a plastic input, a metal input, and combinations thereof. The data inputs may further comprise at least one downtime input such as at least one of a conveyor input, a baler input, a wire tier input, a waiting to bale input, and combinations thereof. The conveyor input may comprise at least one of a mechanical downtime input, an electrical downtime input, a jam downtime input, a structural downtime input, and combinations thereof. The baler input may comprise at least one of a mechanical downtime input, an electrical downtime input, a hydraulic downtime input, a jam knives downtime input, a jam overcharge input, a structural downtime input, and combinations thereof. The wire tier input may comprise at least one of a wire change downtime input, a feed downtime input, a track/fingers downtime input, a reaching home downtime input, a knotter/twister downtime input, a cutter downtime input, a knot eject downtime input, a knot downtime input, an electrical downtime input, a hydraulic downtime input, and combinations thereof. The waiting to bale input may comprise at least one of a warm up input, a clean up input, a breaks/lunch input, a meetings input, a preventive maintenance input, a no material input, a no loader input, a no forklift input, a no labor input, a grade change input, and combinations thereof.

In another aspect, a computer-implemented method of evaluating a production performance of at least one baler machine for producing bales of material is described. The machine is provided with a local monitoring interface communicating with a remotely located computer-based performance interface. The method comprises collecting, using the monitoring interface, downtime and runtime data for the at least one baler machine. The runtime data includes at least acceptable bale production data and the downtime data including at least elapsed downtime data. The method also includes comparing at least one of the collected downtime and runtime data to a predetermined baseline performance value, and generating a production report identifying a difference between the collected data and the baseline performance value.

Optionally, the method further comprises establishing at least one baseline performance value for the at least one baler machine. Establishing the at least one baseline performance value may comprise collecting runtime data over a predetermined time, and averaging the collected runtime data to establish the baseline performance value. The at least one baseline performance value may include, for example, a target tons per hour of baled material produced by the at least one baler machine. The method may further include communicating the collected downtime and runtime data to the remotely located computer-based performance interface. A plurality of baler machines may each have a respective monitoring interface, and the method may further comprise receiving, with the remotely located computer-based performance interface, runtime data and downtime data from each of the respective monitoring interfaces, and assimilating the data from each of the plurality of machines into the production report. Generating the production report may further include comparing the data from the plurality of baler machines to one another.

Also optionally, collecting the downtime data may comprise sensing a downtime condition of the at least one baler machine, and recording information regarding a detected downtime condition. Collecting runtime data may include accepting data and information being input by a human operator of the machine while the machine is operating. The method may include presenting, using the monitoring interface, runtime data inputs and downtime data inputs to a user of the at least one baler machine, and accepting user-selected inputs from the presented runtime data inputs. The presented runtime data inputs include at least one of an operator identification input, a shift input, a maintenance person input, and combinations thereof. The presented runtime data inputs may also include material type inputs, with the material type inputs including one of an OCC type input, a paper input, a fiber input, a plastic input, a metal input and combinations thereof.

Optional presented downtime data inputs may include at least one of a conveyor input, a baler input, a wire tier input, a waiting to bale input, and combinations thereof. The conveyor input may include at least one of a mechanical downtime input, an electrical downtime input, a jam downtime input, a structural downtime input, and combinations thereof. The baler input may include at least one of a mechanical downtime input, an electrical downtime input, a hydraulic downtime input, a jam knives downtime input, a jam overcharge input, a structural downtime input, and combinations thereof. The wire tier input may include at least one of a wire change downtime input, a feed downtime input, a track/fingers downtime input, a reaching home downtime input, a knotter/twister downtime input, a cutter downtime input, a knot eject downtime input, a knot downtime input, an electrical downtime input, a hydraulic downtime input, and combinations thereof. The waiting to bale input may include at least one of a warm up input, a clean up input, a breaks/lunch input, a meetings input, a preventive maintenance input, a no material input, a no loader input, a no forklift input, a no labor input, a grade change input, and combinations thereof. The method may further include generating an alarm during a downtime condition.

In still another aspect, a network-based system for monitoring and evaluating production performance of a plurality of baler machines in various reclamation facilities is disclosed. The system comprises a monitoring interface local to each of the plurality of machines, each monitoring interface collecting downtime data and runtime data for each respective machine; and a performance interface receiving the downtime data and runtime data from each monitoring interface. The performance interface comprises a client system comprising a browser, a database for storing information, and a server system adapted to be coupled to the client system and the database. The server is further adapted to receive the downtime data and the runtime data from the monitoring interfaces, compile the received downtime data and runtime data, and generate a production report identifying operating trends for each of the plurality of baler machines, and comparing the plurality of machines to one another.

Optionally, the server is further adapted to identify an underperforming machine based on the received data. The server may be adapted to establish performance values for each of the plurality of machines based on the received data. The server may be adapted to send the production reports to responsible personnel via, for example, one of facsimile or email. The server may be adapted to periodically generate the production reports, and to archive the received runtime and downtime data.

BRIEF DESCRIPTION OF THE DRAWINGS

FIGS. 7-16 illustrate exemplary embodiments of a user interface for the monitoring interface shown in FIG. 3, wherein:

FIG. 7 is a shift number screen;

FIG. 8 is an operator number screen;

FIG. 9 is a maintenance number screen;

FIG. 10 is a material input screen;

FIG. 11 is a main production input screen;

FIG. 12 is a downtime category screen;

FIG. 13 is a conveyor downtime screen;

FIG. 14 is a baler downtime screen;

FIG. 15 is a wire tier downtime screen; and

FIG. 16 is a waiting to bale downtime screen.

FIGS. 17A-17D illustrate an exemplary embodiment of a report and analysis data produced by the performance interface shown in FIGS. 4 and 5, wherein:

FIG. 17A represents a first page of the report including a portion of a production summary section;

FIG. 17B represents a second page of the report including the remainder of the production summary section and an initial portion of a downtime detail section;

FIG. 17C represents a third page of the report including a further portion of a downtime detail section; and FIG. 17D represents a fourth page of the report including an end portion of the downtime detail section and a downtime category section.

FIGS. 18 and 19 illustrate exemplary baler machine comparison charts produced by the performance interface shown in FIGS. 4 and 5, wherein:

FIG. 18 is a representative baseline comparison chart for a single baler machine; and FIG. 19 is a representative baler machine comparison chart for a group of baler machines.

DETAILED DESCRIPTION OF THE INVENTION

Exemplary embodiments of interfaces, systems, and methods are disclosed herein that overcome problems, difficulties and disadvantages discussed below for monitoring and analyzing operating performance of baler machines. This is achieved at least in part with the provision of monitoring interfaces that are local to sorting and baler systems, and performance interfaces that may be remote from the baler machines. In some embodiments the performance interfaces may even be interactive web-based systems. Methods for collecting and analyzing data relating to operation of a number of baler machines are also disclosed.

Data and information related to the baler machines may be archived in the system databases, and with menu driven user interface and graphic displays, operators may quickly provide runtime and downtime data inputs associated with the respective baler machines, with the performance interfaces rather quickly evaluating baler machine production and performance issues, including but not limited to identifying underperforming machines, permitting effective diagnostic and troubleshooting procedures to optimize baler machine performance, facilitating corrective action to optimize baler machine operation, and directly comparing performance data among different baler machines to reveal operating trends that facilitate strategic planning for a reclamation facility. Interested parties, such as reclamation facility management personnel, may identify optimal modes of machine operation in different facilities. Performance feedback for a plurality of machines in a plurality of locations may be centralized and made available in summary form and in a detailed form to a variety of different persons in different facilities.

In order to appreciate the invention to its fullest extent, the following disclosure will be divided into different parts or segments, wherein Part I discusses particular problems of evaluating baler machine performance; Part II discloses exemplary interface systems for monitoring, analyzing, and evaluating baler machine performance; Part III discloses exemplary processes utilized by the system of Part II to complete its analysis; and Part IV discusses exemplary systems and user interfaces implementing the interface systems and processes disclosed in Parts II and III.

I. Introduction to the Invention

Figure 1:
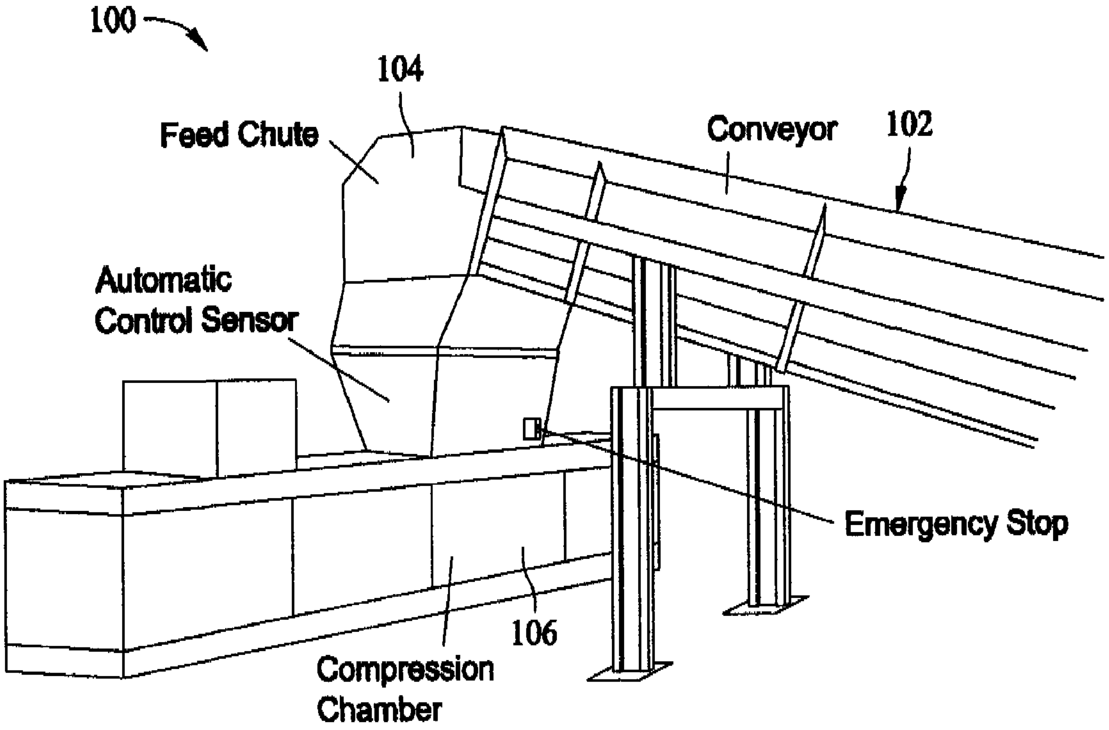
FIG. 1 is a perspective view of a representative baler machine.

FIG. 1 is a perspective view of a representative baler machine 100 that may be used to compress and bind materials, usually industrial waste or byproducts, refuse material, or recovered material for shipping or recycling. The baler machine 100 may be provided with a conveyor system 102 to feed material to a feed chute 104 or input area. The feed chute 104 leads to a compression chamber 106 where the material is compressed into a relatively compact size, often referred to as a bale, with a powered ram. Once compressed, the bale may be bound together with, for example, wire, plastic or string depending on the size of the bale and the particular materials being compressed. While the conveyor system 102 illustrated is perhaps typical, in some instances it could be considered optional, and materials may be loaded into the feed chute 104 by other means, including but not limited to an excavator, A variety of different baler machines are known and are commercially available from a variety of manufacturers. While one exemplary machine 100 is illustrated, it is understood that other types of baler machines exist and may also benefit from the inventive concepts explained below.

For example, known models of baler machines from a variety of manufacturers are generally available in two basic styles: vertical and horizontal. These describe the way the material travels through the machine itself and also refer to the way the material is loaded into the machine. Horizontal baler machines take up more floor space than vertical baler machines, but they have the advantage of greater load capacity and more fully automated functions. Vertical baler machines often are single load machines and need to be manually unloaded when the compacting and baling is complete, and are typically used in smaller facilities that produce less waste and often deal with scrap that is lighter in density and volume. Known baler machines are also available with a single powered ram or dual rams familiar to those in the art, and the machine 100 may be either type in different embodiments.

The baler machine 100 can be used for many types of materials, including organic materials, cloth, paper, metals, and plastics. Specialized baling machines are also available for the extraction of oils and liquids from material.

Figure 2:
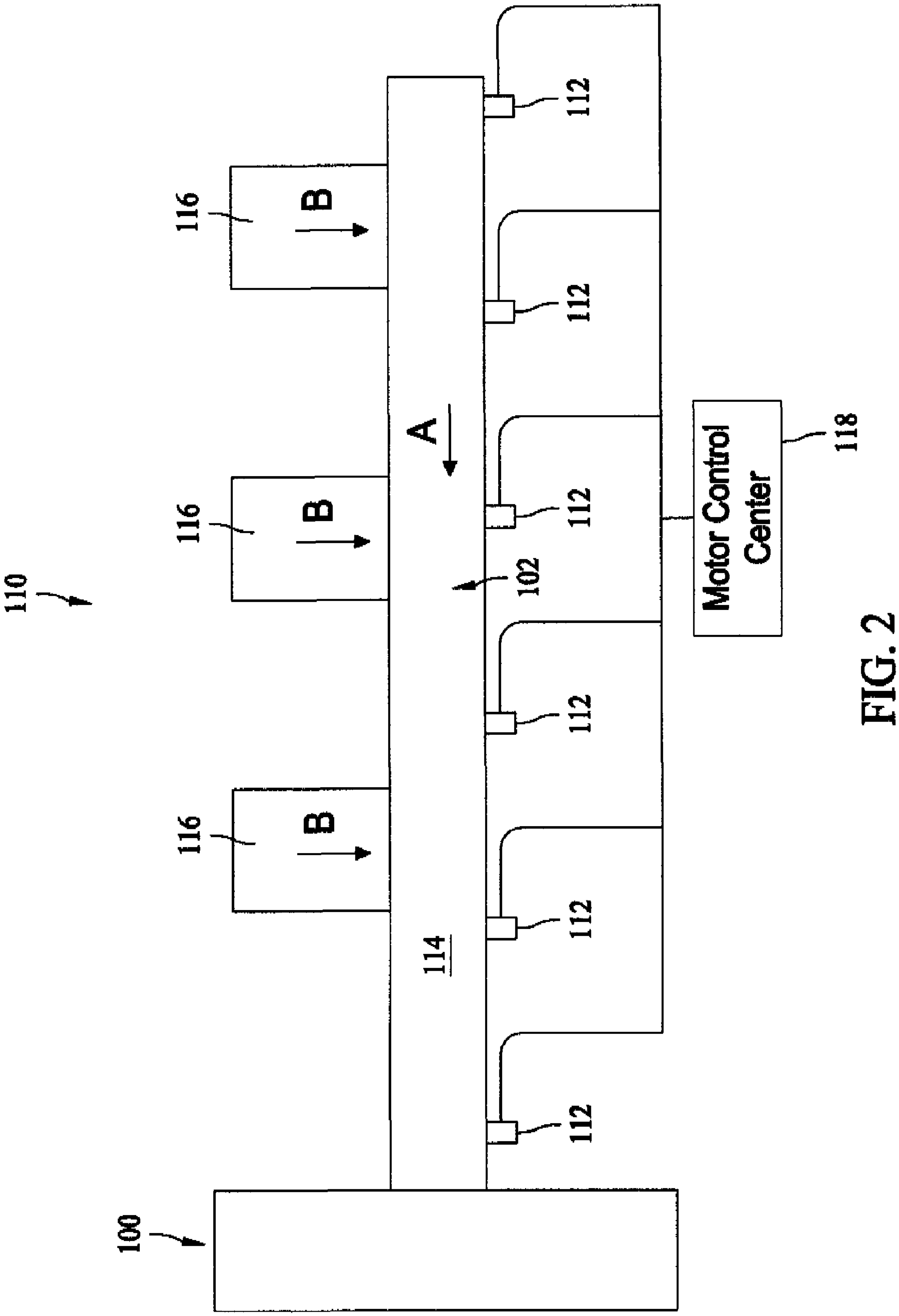
FIG. 2 is a schematic illustration of a baler machine layout.

FIG. 2 is a schematic illustration of an exemplary baler machine layout 110. The conveyor system 102 is elongated, and in an exemplary embodiment may extend for more than a hundred feet along its axial length in a direction parallel to the arrow A in FIG. 2. The conveyor belt 114 may also be relatively wide in a direction generally perpendicular to its axial length, and may be for example more than eight feet wide. In accordance with known conveyor systems, the conveyor system 102 includes a number of motors 112 and a conveyor belt 114. The conveyor belt 114 may be a continuous belt or a series of smaller belts positioned in series to form a the full length of the conveyor system 102 as illustrated. The conveyor motors 112 are operatively linked to a motor control center 118 in accordance with known control techniques. When operated by the control center 118, the motors 112 move the conveyor belt in the direction of arrow A toward the baler machine 100.

A number of baler material loading stations 116 may be positioned along the length of and generally transverse to the conveyor belt 114. The material loading stations 116 provide access points to the conveyor system 102, and specifically the conveyor belt 114. The loading stations 116 may be relatively large, garage-sized or larger areas capable of temporarily storing a large volume of material to be loaded onto the conveyor system 102 in use. Each loading station 116 may be occupied by more than one person loading material, with or without the assistance of machinery. Material may be sorted in the loading stations or elsewhere prior to placement on the conveyor system 102. In one exemplary layout the conveyor system 102 may be located many feet below the elevation of the loading stations 116 in a pit, with the material being loaded from the stations 116 falling onto the conveyor system 102. The conveyor system 102 and the loading stations 116 are sized and dimensioned so that many tons of material per hour may be baled by the machine 100.

Material to be baled, referred to as bale material, is loaded in the stations 116 and moved to the conveyor belt 114 in the direction of arrows B. The conveyor system 102 then moves the material, loaded from the stations 116, in the direction of arrow A toward the baler machine 100 where it is compressed into bales. As shown in FIG. 1, the conveyor system 102 may be inclined and elevated adjacent the baler machine 100, and may drop material into the feed chute 104 (FIG. 1) at a height several stories above a generally horizontal section of the conveyor belt 114 proximate the loading stations 116. As such, gravity may assist in compressing bale material, in addition to the compression of the powered ram(s) in the machine 100. The bales formed in the machine 100 may be generally rectangular bales weighing many hundreds or thousands of pounds each.

In one embodiment the machine 100 further includes automatic tie features that automatically bundle formed bales with, for example, wire, although this may be considered optional in other embodiments. The tied bales of material formed by the baler machine 100 are typically moved by forklift and stacked and stored on site as they are produced with the machine, and the bales are later transported in bulk to another facility for processing and recycling the materials. More than one machine 100 and associated layout 110 may be provided in a site on a reclamation facility to bale the same or different materials.

Baling machines can make material storage easier and cheaper as well as less costly to transport. Objectively evaluating the performance of any given baler machine, however, including but not limited to the machine 100 illustrated is a difficult task. A number of difficult issues have so far have impeded a reliable and accurate evaluation of baler machine production and performance in any particular installation.

For example, the baler machines can be very large, quite complex and rather expensive. Operating the machines in an optimal manner is key to recouping significant costs for acquiring and maintaining the machines. For a variety of reasons, it is often difficult to assess, however, whether any given baler machine is actually operating in an optimal manner.

First, a number of potential equipment failure conditions, error conditions, or maintenance issues may present themselves with such complicated machinery. Such conditions may result in so-called downtime conditions wherein the machine 100 may not produce bales unless appropriate maintenance procedures are completed or unless error conditions or equipment failures are rectified. In some instances, machine-related downtime conditions can be represent a substantial portion of otherwise available production time.

Downtime conditions, however, also may be attributable to other factors apart from the baler machine itself, including but not limited to a lack of material to be baled being fed to the machine 100 with the conveyor system 102, and operator break times or other times when an otherwise operable machine 100 is not being used to produce bales.

Downtime conditions are specifically contrasted with runtime conditions. Runtime conditions correspond to normal operation of the machine with bales being produced by the machine. Of course, one goal of operating the machine 100 is to minimize downtime and maximize runtime, but because of the various causes of downtime that are both machine-related and human-related it can be difficult to evaluate whether or how downtime conditions can be decreased.

As previously noted, many different types of refuse materials may be baled using baler machines, and the baler machines themselves are available in various sizes and configurations. The baler machines typically include many different adjustable operating settings and operating modes geared toward different materials and different needs. The baler machines, however, are often operated by personnel having varying levels of expertise, and also different preferences in operating the machines, such that different operators may choose different settings for the machines. In particular, discerning the limitations of the machines from the limitations of its operators can be especially difficult.

The output capability of the baler machine, such as the machine 100, is partially dependent on the ability of its operators to select the most appropriate operating settings and modes for materials being made, and also in properly operating and maintaining the machine components. While the operators tend be skilled workers, and much effort is made to properly train them, the operational results of baler machines may vary widely amongst human teams tasked with operating them. Consistently identifying and using the optimal machine settings can be difficult, and sometimes is a trial and error process where the implications of certain machine settings and modes to overall machine performance is poorly understood, if it is understood at all. Simply put, a machine being run at sub-optimal settings will not produce optimal outputs, but is often not apparent when sub-optimal machine settings are being used. Consequently, it can therefore be difficult to assess whether there is room for improvement in runtime performance of the baler machine.

Still further, many different types of refuse materials may be baled using such baler machines, and baler machines are available in various sizes and configurations, making it difficult to compare the performance of different machines to one another. This can be particularly problematic from a strategic planning perspective wherein facility managers are trying to decide, for example, what types of equipment to purchase to complement existing equipment or whether existing equipment should be replaced.

For at least these reasons, efficient and optimal operation of baler machines is difficult to objectively assess, and more difficult to achieve. Such problems are compounded when trying to evaluate a number of different baler machines in different facilities.

As an illustrative example, a significant producer in the baling industry may own twenty-eight different balers machines, including machines provided by seven different manufacturers, with many of the machines being customized to meet particular needs of the respective reclamation facilities in which they are located. The locations may include, for example, twenty three different plants with diverse product streams, commodity form and product mix. Different workers at the different plants operate the machines in multiple shifts. The management challenges in tracking and evaluation performance of the baler machines in such circumstances are simply enormous.

With each baler machine being a component of a larger collection of balers, assessing the performance of the network requires assessment of the respective contribution of each baler machine to the overall network. For at least the reasons set forth above, however, assessing the performance of individual machines, let alone the collection of machines, is elusive.

II. The Monitoring and Performance Interfaces of the Invention

The above-described problems are overcome in large part with the provision of monitoring and performance interfaces that comprehensively gather and analyze a variety of different data relating to runtime and downtime conditions of baler machines. The interfaces provide much needed insight for objectively evaluating baler machines, either individually or collectively. The interfaces are amenable to monitoring and tracking performance of various types of machines in various locations, and facilitate identification of trends and allow comparisons to be drawn and conclusions to be made regarding potential improvements to be made toward optimizing their use. Strategic planning is also facilitated.

Figure 3:
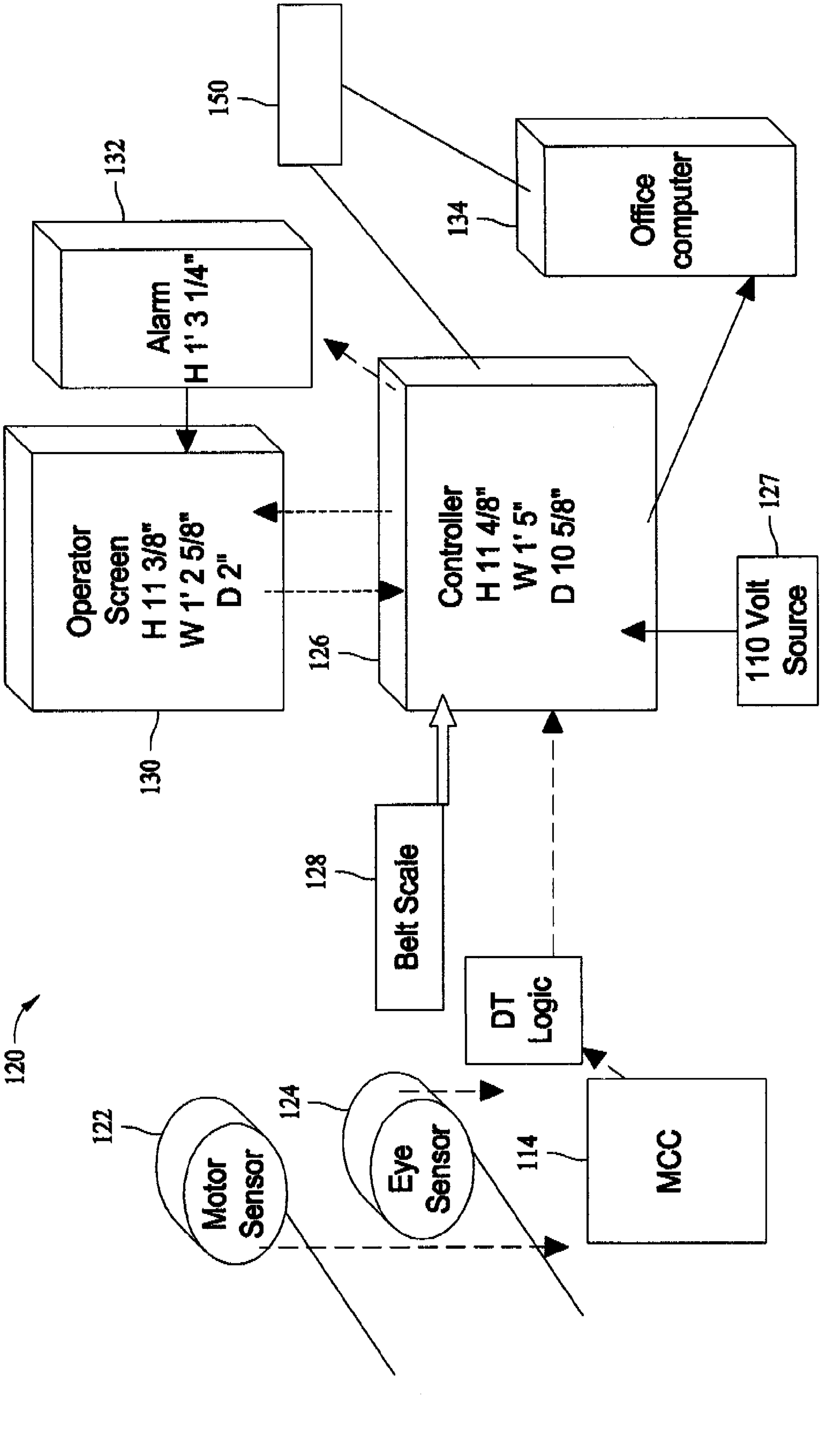
FIG. 3 is a block diagram of a monitoring interface for the machine shown in FIGS. 1 and 2.

FIG. 3 is a block diagram of a monitoring interface 120 for the machine 100 (FIGS. 1 and 2) that facilitates objective evaluation of the production performance of at least one baler machine, such as the machine 100 described above for baling many types of materials for various purposes (e.g., trash, refuse, recycling, etc.) including organic materials, cloth, paper, metals, and plastics.

As shown in FIG. 3, the monitoring interface 120 includes a motor sensor 122 and a conveyor eye sensor 124 that communicate with the motor control center 118 of the conveyor system 102 (FIG. 2). The sensors 122 and 124 are known in the art and respectively detect or determine movement of the motors 112 (FIG. 2) and the conveyor belt 114 (FIG. 2), and a presence of bale material on the conveyor belt 114 in a known manner. The sensors 122 and 124 may pre-exist in the conveyor system 102 or may be separately provided for the purposes described below. Signals from the sensors 122 and 124 are input to the control center 118 and may be used to operate the conveyor system 102. Alternatively, the sensors 122 and 124 may be directly input to a controller 126 without involving the motor control center 122 and 124.

The controller 126 and a power supply 127 are also provided, and the controller 126 and is in communication with the motor control center 118 so that it may also be provided with the signal inputs from the sensors 122 and 124. It is contemplated that the controller 126 be located on site and proximate to the baler machine 100, although it could be located elsewhere in other embodiments, including at a remote location from the machine. Also, the controller 126 and power supply 127 as illustrated are provided separately from the conveyor control center 118 such that an existing machine may be upgraded with the interface 120 in a retrofit fashion. It is appreciated, however, that in a new machine installation the functionality of the controller 126 could be integrated into the conveyor control center 118, or still another controller for the machinery, if desired, including the baler machine 100 itself. That is, the controller 126, or the functionality of the controller 126 as explained below, may be implemented as an automatic control feature of the baler machine itself, as a opposed to a separately provided control element.

The communication between the motor control center 118 and the controller 126 may be established in a known manner using, for example, a hard-wired connection, a wireless communication technique such as radio frequency (RF) signal transmission techniques or other wireless schemes, fiber-optic signal transmission, and the like as known in the art. As shown in FIG. 3, a conveyor belt scale sensor 128 may also be provided and input to the controller 126.

The controller 126 may be for example, a microcomputer or other processor-based device. The controller 126 may include a microprocessor and a memory for storing instructions, control algorithms and other information as required to function in the manner explained below. The controller memory 126 may be, for example, a random access memory (RAM), or other forms of memory used in conjunction with RAM memory, including but not limited to flash memory (FLASH), programmable read only memory (PROM), and electronically erasable programmable read only memory (EEPROM). As those in the art will appreciate, the controller may also be implemented with programmable logic controllers and the like to receive and respond to input signals and data as described below.

For purposes of the controller 126, the sensors 122 and 124, and also the belt scale 128, may be used to signal downtime conditions to the controller 126. That is, the controller 126 is interfaced with the sensors 122, 124 and 128 and may receive and record data associated with detected downtime conditions. For example, if the conveyor motors 112 (FIG. 2) are not moving or there is no bale material present on the conveyor belt 114, as determined with the sensors 122, 124 and 128, the controller 126 automatically detects a downtime condition for the machine 100. The controller 126 may record the times and durations of such events for monitoring and analysis purposes.

While three sensors 122, 124 and 128 are illustrated, it is appreciated that greater or fewer numbers of sensors, as well as other types of sensors, may likewise be utilized to detect downtime conditions of a single machine or more than one machine as desired. As one example, one or more sensors may be provided in other areas or components of the machine to detect downtime conditions, such as by monitoring the frequency of cylinder movement in the compression chamber of the machine to detect machine downtime conditions. Also, more than one controller 126 may be provided to accept sensor inputs from different machines or from different areas or component of a single machine.

As also depicted in the illustrative embodiment of FIG. 3, the controller 126 is further connected to an input device 130 that may take the form of a display screen, and an alarm element 132 that allow downtime conditions to be communicated to interested parties. The controller 126 may be configured to trigger an alarm condition, via the alarm element 132, in response to signals from the sensors 122, 124 and 128 and/or other events or alarm conditions.

In one embodiment, the input device 130 is provided for the benefit of the baler machine operator and is located locally on site with the baler machine 100, although in other embodiments the input device 130 may be located elsewhere. As explained further below, the input device 130 may notify the operator of a downtime condition so that the operator may attend to it or instruct others to respond to the downtime condition, and also seek input regarding the cause of the downtime condition for analysis purposes. As will become apparent below, runtime data and information may be also input by an operator using the input element 130. For example, the input element 130 may accept user provided data inputs regarding runtime operation of the baler machine, such as a material type input for material being baled, an acceptable bale input for satisfactory bales as they are produced, and an unacceptable bale input to track the success of the machine in use.

In one embodiment the input element 130 may be a touch sensitive screen known in the art for interactive, menu-based input by the operator through touching selected regions or areas of the screen. That is data inputs may be presented to a user such as an operator for selection by touching a predetermined area of the screen. Data inputs selected from such a display may include, for example, an operator identification input, a shift input, a maintenance person input, other operator information and combinations thereof.

In other embodiments other types of display screens may be utilized. The input device 130 may alternatively take the form of a keyboard or mouse which an operator or other person may use to enter the necessary data inputs. More than one input device 130 may be provided for the same machine or for different machines in various embodiments.

The alarm element 132 may be, for example, an alarm beacon familiar to those in the art that is activated or illuminated by the controller 126 during a downtime condition or other specified alarm condition. The alarm element 132 may be located, for example, over an operator station or in another highly visible location so that it may be easily seen when activated. As such, personnel, including but not limited to the machine operator, need not be physically present at the location of the input element 130 to receive notice of a downtime or alarm condition. Still other audio or visual alarm elements may be provided in combination with or in lieu of an alarm beacon to provide notification of downtime/alarm conditions and summon personnel to help respond to them.

The controller 126 is also placed in communication with a performance interface, which in different embodiments may be a stand-alone performance interface in the form of an office or personal computer system 134 used to analyze the baler machine performance as described below.

The computer 134 may further communicate with a remotely located and networked performance interface computer system 150 described in detail below that is particularly advantageous for analyzing the performance of multiple baler machines. In still another embodiment, the controller 126 may communicate directly with the remotely located performance interface system 150. That is, the controller may be configured to communicate data received, accepted and/or recorded, via any known manner, to the remote computer-implemented performance interface 150 for generation of a detailed production report.

Communication between the controller 126 of the monitoring interface 120 and either of the computer systems 134 and 150 may be established in any of a variety of techniques known in the art so that data may be transmitted from the controller 126 to the computer systems 134 and/or 150 for analysis purposes.

Figure 4:
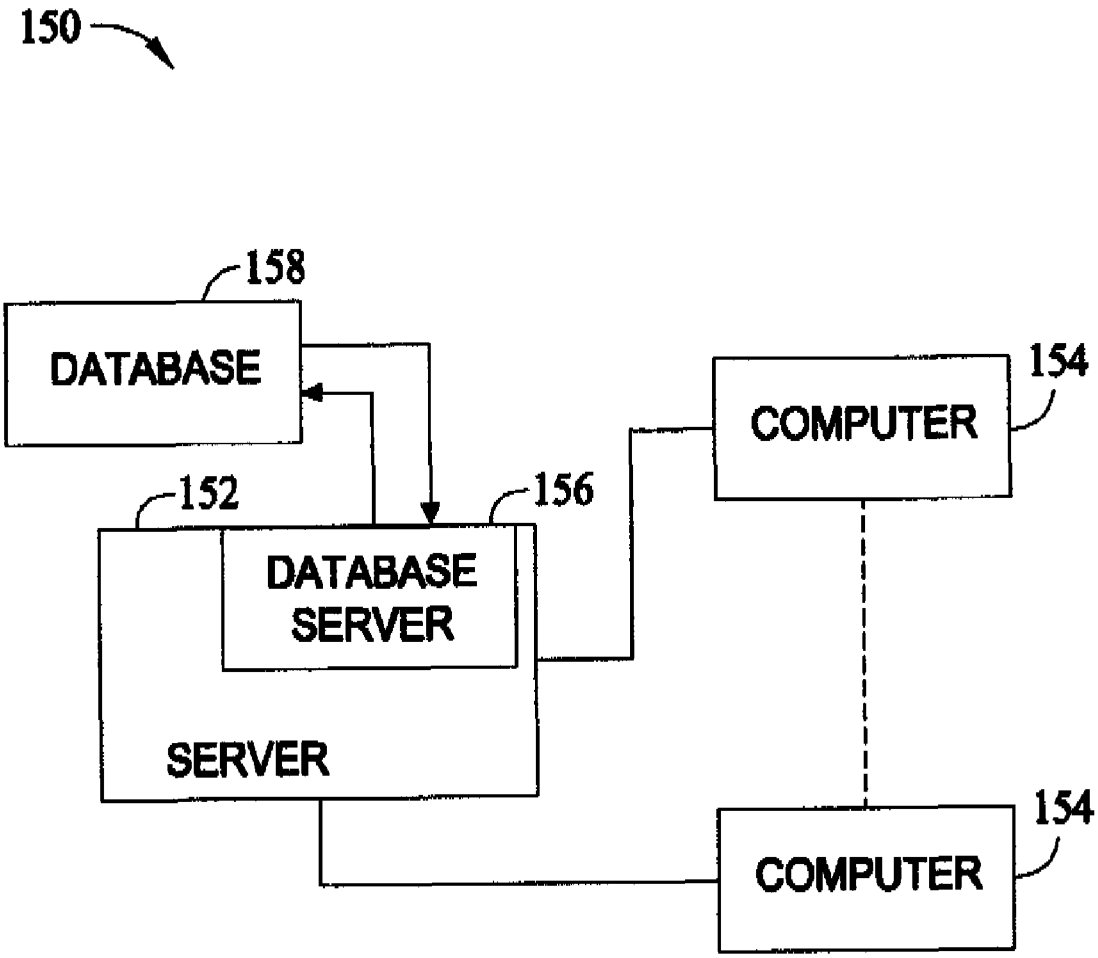
FIG. 4 is a simplified block diagram of an exemplary embodiment of an exemplary performance interface for the machine and monitoring interface shown in FIGS. 1-3.
Figure 5:
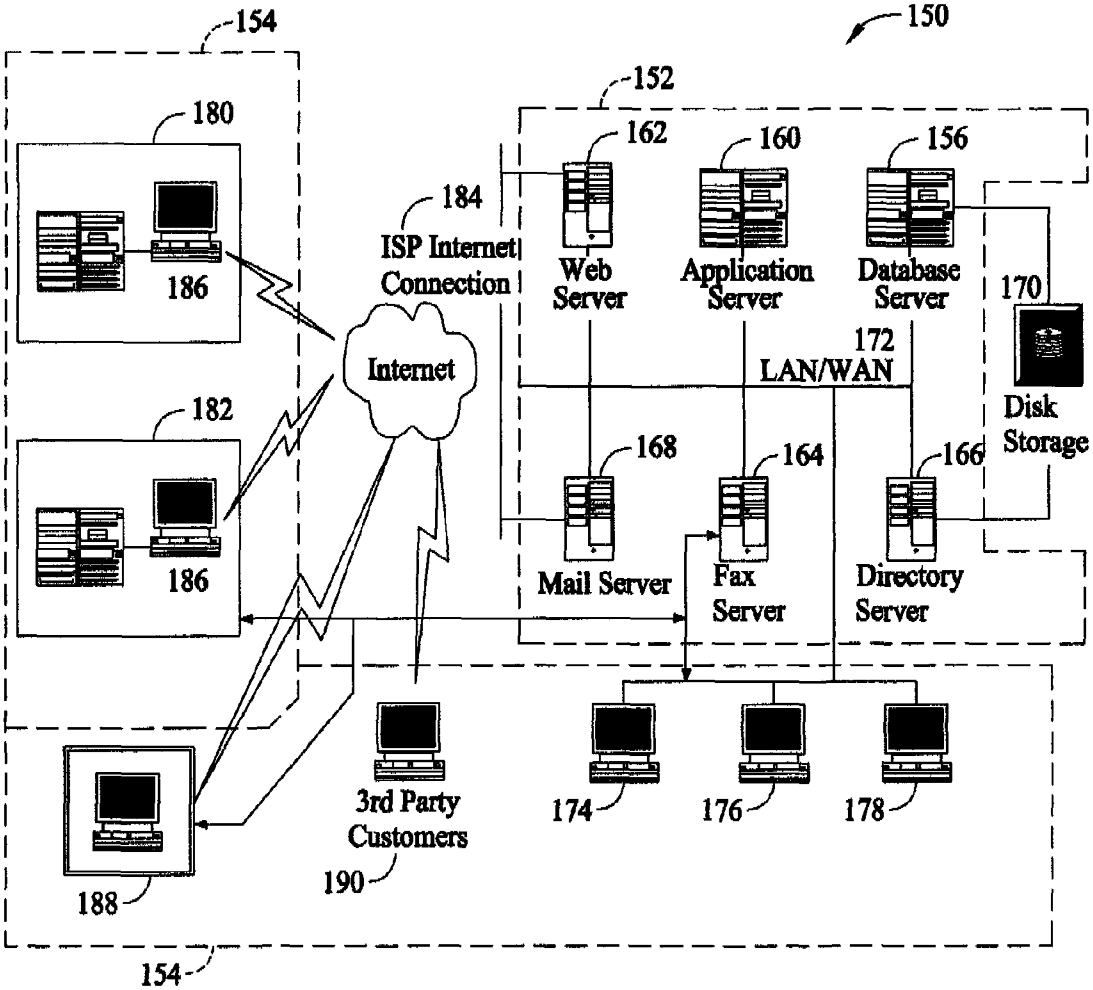
FIG. 5 is an expanded block diagram of an exemplary embodiment of a server architecture of the performance interface.

FIGS. 4 and 5 illustrate aspects of an exemplary performance interface 150, that in one embodiment may be a computer program or software embodied on a computer readable medium and utilizing, for example, a Structured Query Language (SQL) with a client user interface front-end for administration and a web interface for user input, access, and information retrieval and reports by persons interested in assessing and evaluating, for example, runtime and downtime performance of a baler machine. The performance interface 150 may be web enabled and may be run on a business-entity intranet or alternatively may be fully accessed by individuals having an authorized access outside the firewall of the business-entity through the Internet. In an exemplary embodiment, the performance interface 150 may be run in a Windows® NT environment or operating system that is commercially available from Microsoft Corporation of Redmond, Wash., or another operating systems familiar to those in the art, whether or not Windows-based operating systems. The application may be flexible and designed to run in various different environments without compromising any major functionality.

FIG. 4 is a simplified block diagram of an exemplary embodiment of the performance interface 150 including a server system 152, and a plurality of client sub-systems, also referred to as client systems 154, connected to the server system 152. Computerized modeling and grouping tools, as described below in more detail, are stored in the server system 152 and can be accessed by a requester at any one of the client systems 154. In one embodiment, the client systems 154 are computers or other electronic devices including a web browser, such that the server system 152 is accessible to the client systems 154 using, for example, the Internet.

The client systems 154 may be interconnected to the Internet through many interfaces including, for example, a network such as a local area network (LAN) or a wide area network (WAN), dial-in-connections, cable modems and special high-speed ISDN lines. The client systems 154 may be any device capable of interconnecting to the Internet including a web-based phone, personal digital assistant (PDA), or other web-based connectable equipment or equivalents thereof. A database server 156 is connected to a database 158 containing information on a variety of matters, as described below in greater detail. In one embodiment, the database 158 is centralized and stored on the server system 152, and the database 158 be accessed by potential users at one of the client systems 154 by logging onto the server system 152 through one of the client systems 154. In an alternative embodiment, the database 158 may be stored remotely from server system 152 and may be non-centralized.

FIG. 5 is an expanded block diagram of an exemplary embodiment of a server architecture of the performance interface 150 including the server system 152 and the client systems 154. The server system 152 may include the database server 156, an application server 160, a web server 162, a fax server 164, a directory server 166, and a mail server 168. A disk storage unit 170 may be coupled to the database server 156 and the directory server 166. The servers 156, 160, 162, 164, 166, and 168 may be coupled in a local area network (LAN) 172. In addition, a system administrator's workstation 174, a user workstation 176, and a supervisor's workstation 178 may be coupled to the LAN 172. Alternatively, workstations 174, 176, and 178 may be coupled to LAN 172 using an Internet link or are connected through an Intranet.

Each workstation 174, 176, and 178 may be a personal computer or other electronic device having a web browser. Although the functions performed at the workstations typically are illustrated as being performed at respective workstations 174, 176, and 178, such functions may be performed at one of many personal computers coupled to the LAN 172. Workstations 174, 176, and 178 are illustrated as being associated with separate functions only to facilitate an understanding of the different types of functions that can be performed by individuals having access to the LAN 172.

The server system 152 in one embodiment is configured or adapted to be communicatively coupled to various individuals via some of the client systems 154, including employees 180 associated with the performance interface 150, and to third parties 182 in communication with the server system 152 using, for example, an ISP Internet connection 184. The communication in the exemplary embodiment is illustrated as being performed using the Internet, however, any other wide area network (WAN) type communication can be utilized in other embodiments. That is, the performance interface 150, and its operating algorithms and processes described below are not limited to being practiced using the Internet.

In an exemplary embodiment, any authorized individual having a workstation 186, 188 can access the server system 152 via one of the client systems 154. At least one of the client systems 154 includes a manager workstation 188 located at a remote location. Workstations 186 and 188 may be personal computers or other electronic devices having a web browser. Additionally, third party customers may communicate with the server system 152 via a workstation 190 having, for example, a web browser.

The fax server 164 may communicate with remotely located client systems 154, including the workstations 186, 188 and 190. The fax server 164 may be configured or adapted to communicate with other client systems including but not limited to the workstations 174, 176 and 178 as well for reporting purposes.

The functionality and programming of the interfaces 120 and 150 is explained in detail below with respect to the methods and processes described below in Part III and the user interfaces disclosed in Part IV.

III. Exemplary Interface Methods and Processes

The technical effect of the processes and systems described herein is achieved when data and information pertaining to operation of baler machine(s) is entered, transmitted, downloaded or otherwise accepted by the performance interfaces 120 and 150. As will become apparent, the data and information is in part provided with the interfaces 120 and 150, in part automatically detected by the monitoring interface 120, and in part obtained through inputs entered by persons. A unique combination of automatic and user-entered feedback regarding machine performance in both runtime and downtime conditions allows a rather comprehensive and objective evaluation of baler machine performance.

In illustrative examples, the data and information used by the monitoring interface 120 shown in FIG. 3 may be supplied and accepted through the sensors 122, 124 and 128, through the input element 130 and/or supplied directly to the controller 126. In one embodiment, the monitoring interface 120 is provided with software prompts requesting certain runtime and downtime information from machine operators while the baler machine is operating. In another embodiment, the machine runtime and downtime information is entered after-the-fact by machine operators or other persons.

The data and information used by the performance interface 150 may be supplied and accepted through any of the workstations connected to the server system 152 as described above, from any of the controllers 126 associated with one or more baler machines being monitored, or may be supplied from still other sources if desired. Exemplary data and information utilized by the system is described in some detail below, but in an exemplary embodiment the monitoring and performance interfaces include production query capabilities of over forty items to assess machine performance, ten performance focus options, four downtime category types that are monitored, and twenty seven different downtime conditions to be tracked. The performance interface 150 may generate detailed production reports in which machine performance of one of more machines may be analyzed in an objective manner across a number of aspects. Analysis information may be made available in varying degrees of detail, and may be presented in graphical form.

The data and information supplied to the system 150 may be stored or archived in the aforementioned server system 152, and the data and information may be accessed by the system 150 to permit a reliable assessment, evaluation or analysis of baler machine runtime and downtime considerations.

The processes utilized by the interfaces 120 and 150 will now be explained using the example of the baler machine 100 shown in FIGS. 1 and 2, wherein the monitoring interface 120 is configured to ensure efficient and reliable data collection, and the performance interface 150 is configured to efficiently and reliably evaluate and assess performance of the machine 100 and/or other baler machines provided with a monitoring interface 120 using the collected data.

Figure 6:
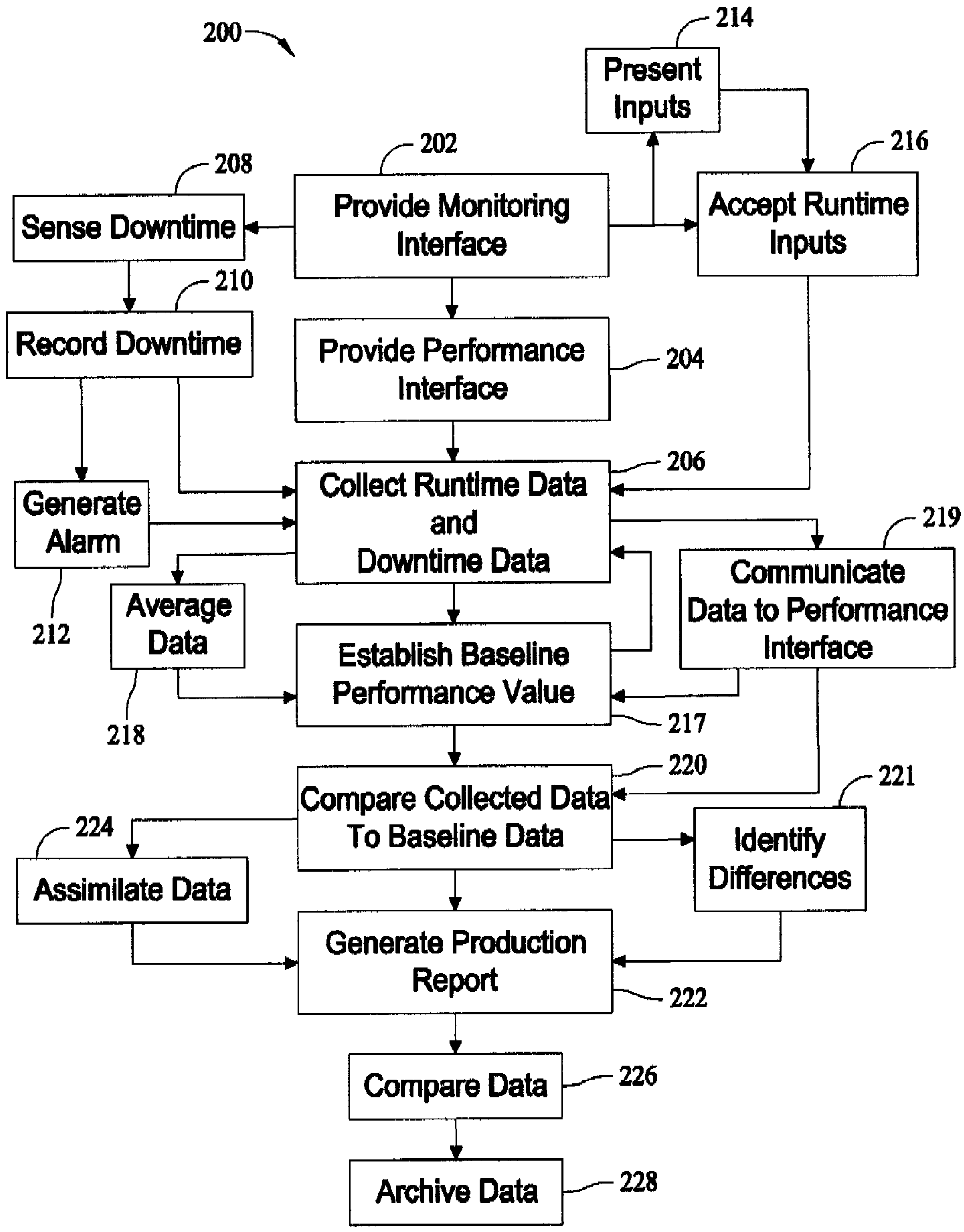
FIG. 6 illustrates an exemplary flowchart illustrating exemplary monitoring and performance processes utilized by the interfaces shown in FIGS. 3-5.

As shown in FIG. 6, method processes 200 of evaluating a production performance of at least one baler machine, such as the machine 100, for producing bales of material is illustrated. The method includes providing 202 the machine with a local monitoring interface and providing 204 the performance interface, which may be a remotely located computer system 150 or another computer 134 as shown in FIG. 3. As previously explained, in different embodiments a single machine may be provided with a single monitoring interface, a plurality of baler machines may each be provided with a respective monitoring interface, or a single monitoring interface may monitor multiple machines.

Once so provided, downtime and runtime data for the baler machine may be collected 206, using the monitoring interface. As will be explained further below, the runtime data may include acceptable bale production data and the downtime data may include elapsed downtime data. As explained above, certain downtime conditions may be sensed 208 and recorded 210 with the monitoring interface, with corresponding data being collected 206 as such events occur. Appropriate alarms may be generated 212 in response to sensed conditions as well.

In some embodiments, the monitoring interface provided in step 202 is capable of presenting 214 input selections to a user, and accept 216 user-entered inputs. Such steps 214 and 216 may be particularly advantageous for embodiments of monitoring interfaces having a touch sensitive display screen, and may be used, for example, to collect both runtime and downtime data. The monitoring interface may prompt the user to enter runtime and downtime data in real time as they occur, although this may be considered optional in other embodiments.

By collecting data at step 206, the collected data may provide a reliable basis for establishing 217 one or more baseline performance values which may, in turn, provided a basis for evaluating the performance of machines being monitored. As one example, the data may be collected at step 206 for a predetermined period of time, and then averaged 218 to establish the baseline value(s) of step 217. For example, a target tons per hour of baled material, corresponding to the number of acceptable bales produced by the baler machine, may be collected over a period of time and averaged to provided a baseline bale production value that the machine may reasonably be expected to produce. As another example, total downtime in a number of different downtime categories may be collected and averaged to provide baseline values of downtime that may be encountered during use of the machine. The collected data may be averaged over a period of, for example, several months or another sufficient period to provide a reasonable predictor of machine performance based on historical data.

The averaging of the baseline performance values may be performed, for example, by the controller 126 of the monitoring interface 120 or a local computer system performance interface 134 shown in FIG. 3. Alternatively, in an embodiment having a remotely located performance interface, the collected data from step 206 may be communicated 219 to the remote location, and the baseline performance values may be established 217 apart from the monitoring interface. Still further, the establishment of baseline performance values may occur both locally in the monitoring interface and remotely in the performance interface. For example, the monitoring interface may establish rolling averages of performance aspects, and communicate them to the remote performance interfaces that compute baseline performance values based on the rolling averages.

Establishing a baseline value in such a manner as steps 217 and 218 is believed to be particularly useful because the established values obtained are specific to each machine being monitored, and thus account for unique considerations for each machine being monitored, including but not limited to unique teams of persons running and maintaining the machines, particular operating conditions that may not be present for other machines, and variations in materials presented to the machine for baling. As such, the established baseline values are ensured to be realistic and accurate for each baler machine, as opposed to theoretically values based on machine capability that may not be reflected in actual use. It is noted that the baseline performance values established in such a manner may result in otherwise similar or identical machine models provided by the same manufacturer to have different baseline performance values.

In further embodiments, the collected data may be averaged periodically to provide updated baseline performance values. That is, the baseline performance values need not be fixed values, but may float up or down to account for recent changes to machine performance to ensure that baseline performance values remain realistic and prevent the baseline values from becoming artificially high or low because of unusual operating conditions. The baseline performance values over various time periods could themselves be averaged to further refine the baseline values utilized.

While establishing the baseline performance value(s) in light of historical operating data is believed to provide apparent benefits, it is contemplated, however, that the baseline performance value(s) could be determined in another manner if desired.

Once data is collected 206 and the baseline performance values are established 217, the collected downtime and/or runtime data may be compared 220 to the predetermined baseline performance value(s). Further, differences can be identified 221 and a production report may be generated 222 wherein the differences can be assessed and analyzed.

In embodiments wherein multiple machines are being monitored, the collected and compared data for a number of machines may be assimilated 224 for the report generated as step 222 such that a single report may include data corresponding to a plurality of machines. Such an assimilated report is believed to be particularly useful in that it allows for different machines to be compared 226 to one another in the report. As such, underperforming machines can be rather easily identified and insight into the causes for such underperformance, both human-related and machine-related, may be gathered by interested parties, such as facility managers where the baler machines are located.

The data 228 is archived in the performance interface so that production reports may be generated 222 over any time of interest where data is available. That is, daily reports, weekly reports, monthly reports, or yearly reports, to name a few, may be generated by the system. Such use of archived data is particularly useful for identifying long term trends in the data, and facilitates strategic planning decisions.

IV. The User Interfaces of the Invention

Having now described exemplary processes utilized by the monitoring and performance interfaces, the methods and processes described above may be implemented using menu-driven input screens described in the examples below that guide the user through entering of pertinent runtime and downtime data inputs to be collected.

FIGS. 7-16 illustrate exemplary displays of a user interface for the monitoring interface 120 (FIG. 3) in an exemplary embodiment wherein the input element 130 is a touch sensitive screen. The examples of FIGS. 7-16 are illustrative only, and it is contemplated that other user interfaces and displays may likewise be utilized in different embodiments without limitation. It is further appreciated that other displays may likewise be tailored for use with a mouse and cursor familiar to those in the art. Still other menus and displays may be utilized in alternative embodiments with similar effect.

Figure 7:
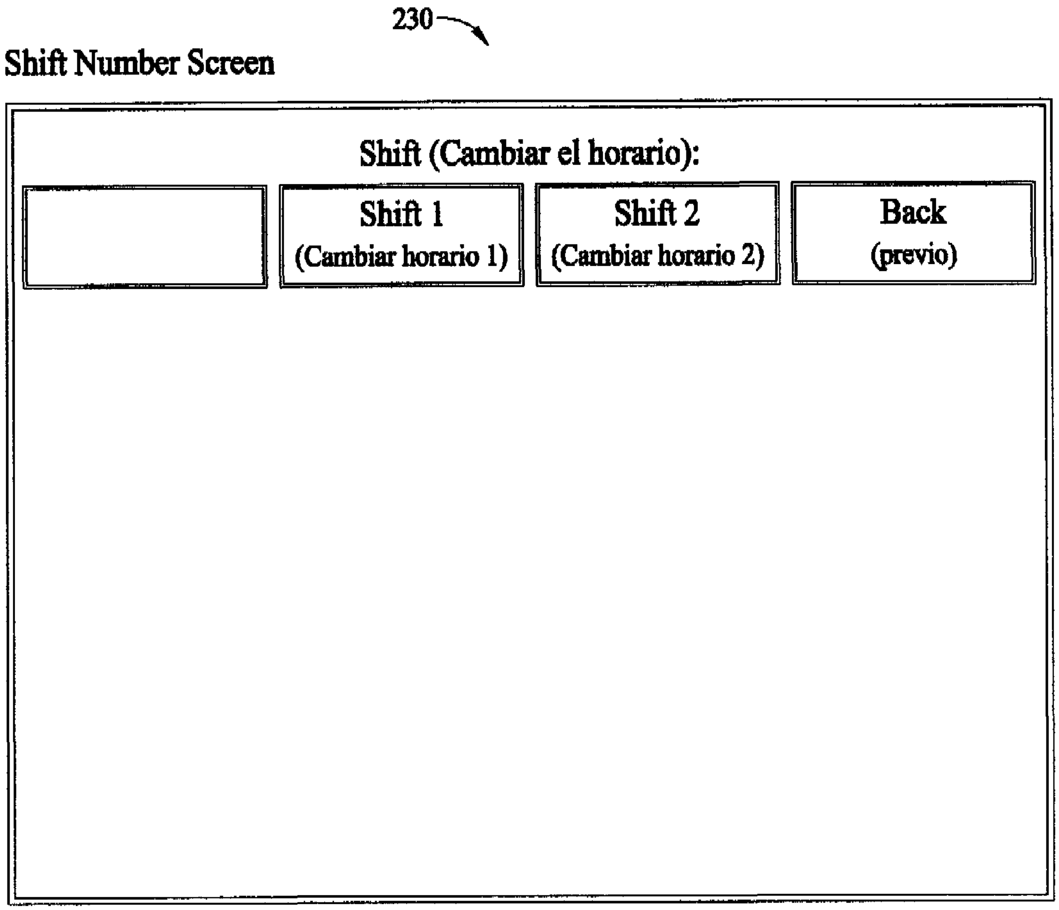

FIG. 7 is a shift number screen 230 presented to a baler machine operator beginning his or her shift. The exemplary shift number screen 230 includes a "Shift 1" area, a "Shift 2" area, and a "Back" area that are each bordered by a block outline in FIG. 7. The operator may select any of the areas presented by touching the screen within the area of choice. By pressing one of the areas, the operator makes a corresponding input to the monitoring interface to identify his or her working shift. This shift number screen 230 may include additional input areas as desired to accommodate additional shifts (e.g., up to four shifts) as appropriate.

Figure 8:
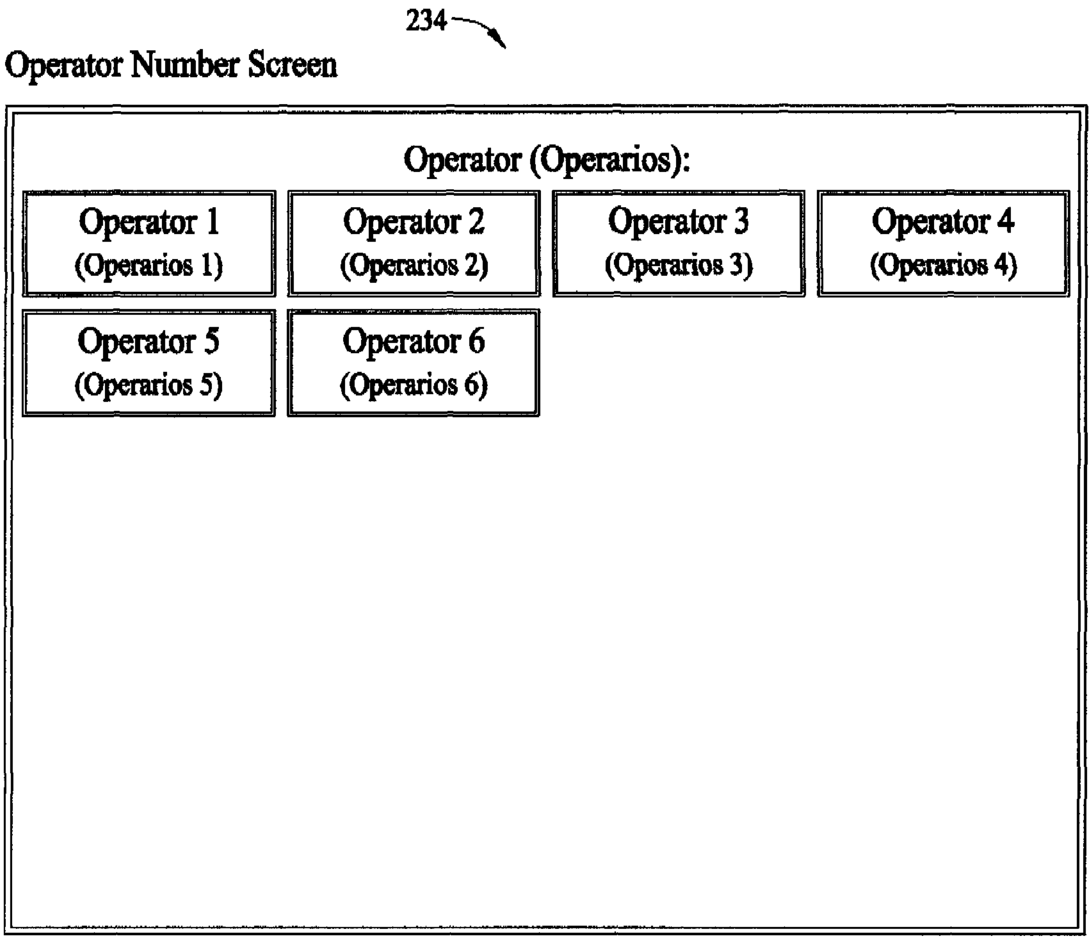

FIG. 8 is an operator number screen 234 that is presented to the baler machine operator after entering his or her shift using the screen 230. The exemplary operator number screen 234 includes an "Operator 1" area, an "Operator 2" area, an "Operator 3" area, an "Operator 4" area, an "Operator 5" area, and an Operator 6" area that are each bordered by a block outline in FIG. 8. By pressing one of the operator areas in the screen 234, the operator makes a corresponding input to identify himself or herself to the monitoring interface. In other embodiments, greater or fewer areas may be provided for operator identification, and actual operator names or other indicia may be provided in lieu of operator numbers as shown.

Figure 9:
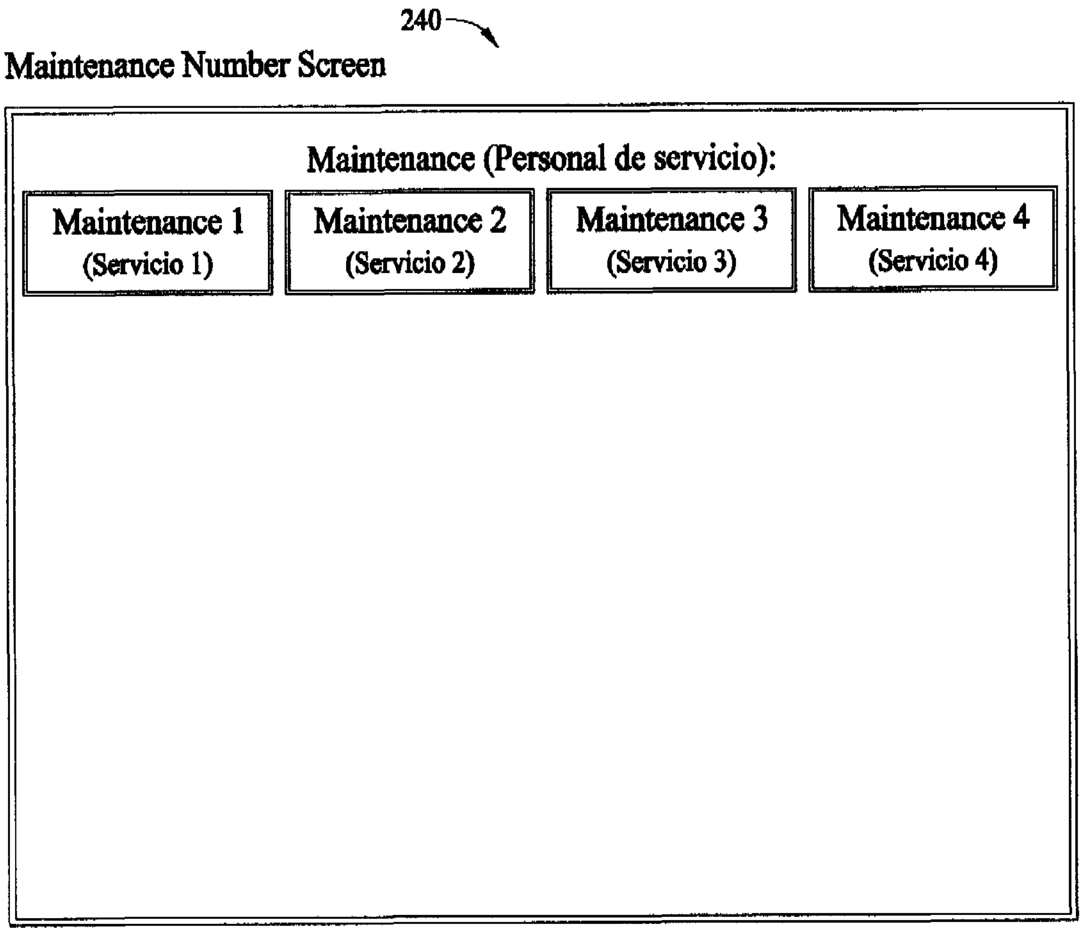

FIG. 9 is a maintenance number screen 240 that is presented to the baler machine operator after entering identifying himself or herself using the screen 234. The exemplary maintenance number screen 240 includes a "Maintenance 1" area, a "Maintenance 2" area, a "Maintenance 3" area, and a "Maintenance 4" area that are each bordered by a block outline in FIG. 9. By pressing one of the maintenance areas in the screen 230, the operator makes a corresponding input to identify to the monitoring interface a machine maintenance person that will be working with the machine operator. In other embodiments, greater or fewer areas may be provided for maintenance worker identification, and actual maintenance worker names or other indicia may be provided in lieu of maintenance numbers as shown.

FIG. 10 is a material input screen 250 that is presented to the baler machine operator after entering identifying the maintenance person for the shift using the screen 240. The exemplary material input screen 250 includes twenty four different types of material that may be fed to the baler machine, with each area bordered by a block outline in FIG. 10. By pressing one of the material areas in the screen 250, the operator makes a corresponding input to identify material that is being baled to the monitoring interface. In other embodiments, greater or fewer material input areas may be provided, possibly using more than one screen to accommodate additional material inputs. Many types of material inputs, including organic materials, cloth, paper, metals, and plastics may be accommodated in the material input screen. Additionally, inputs made from the screen 250 may be communicated to one or more controllers for the baler machine so that appropriate settings for the machine are automatically selected for the input material type.

Having made the selections in the screens shown in FIGS. 7-10, the operator is presented with a main production input screen 260. The screen 260 includes a good bale area and a junk bale area that may be selected by the operator to indicate the production of an acceptable bale or unacceptable bale, respectively. When either the good bale or the junk bale area is pressed, a number in a counter area just above the bale areas increments upwardly by one bale and is logged in the monitoring interface. As such, a running total is kept and presented to the operator for good bales and junk bales, respectively, that are produced in the shift.

While in an exemplary embodiment, the main production input screen 260 provides for an automatic bale count with an electronic interface, in another embodiment, good and junk bale counts may be manually recorded by the machine operator without assistance of a dedicated interface screen for such a purpose. Such manually recorded data may be input, transmitted, downloaded or otherwise communicated to the performance interface for purposes of generating a production report.

Additionally, the exemplary screen 260 shows the current shift number, operator number, maintenance person and material type selected via the screens shown in FIGS. 7-10. A Setup area is provided that, when selected, allows the operator to end the shift or to return to the main screen 260. In another embodiment, the Setup area may allow, when selected and if desired, an operator to make corrections or changes to the current shift number, operator number, or maintenance person.

A Material area is also included in the Main screen 260, and by pressing the Material area, the operator is returned to the materials screen 250 shown in FIG. 10. Thus, a new material type input may be selected for baling without restarting a shift.

The screens of FIGS. 7-11 are utilized to collect a number of different types of baler machine runtime status that may be useful for analysis purposes. By accounting for specific persons using the machine, the screens 7-11 account primarily for human-related production factors and the effectiveness of the operators to use the machine. The monitoring interface also accounts for machine-related factors, however, in the downtime screens discussed below.

Figure 11:
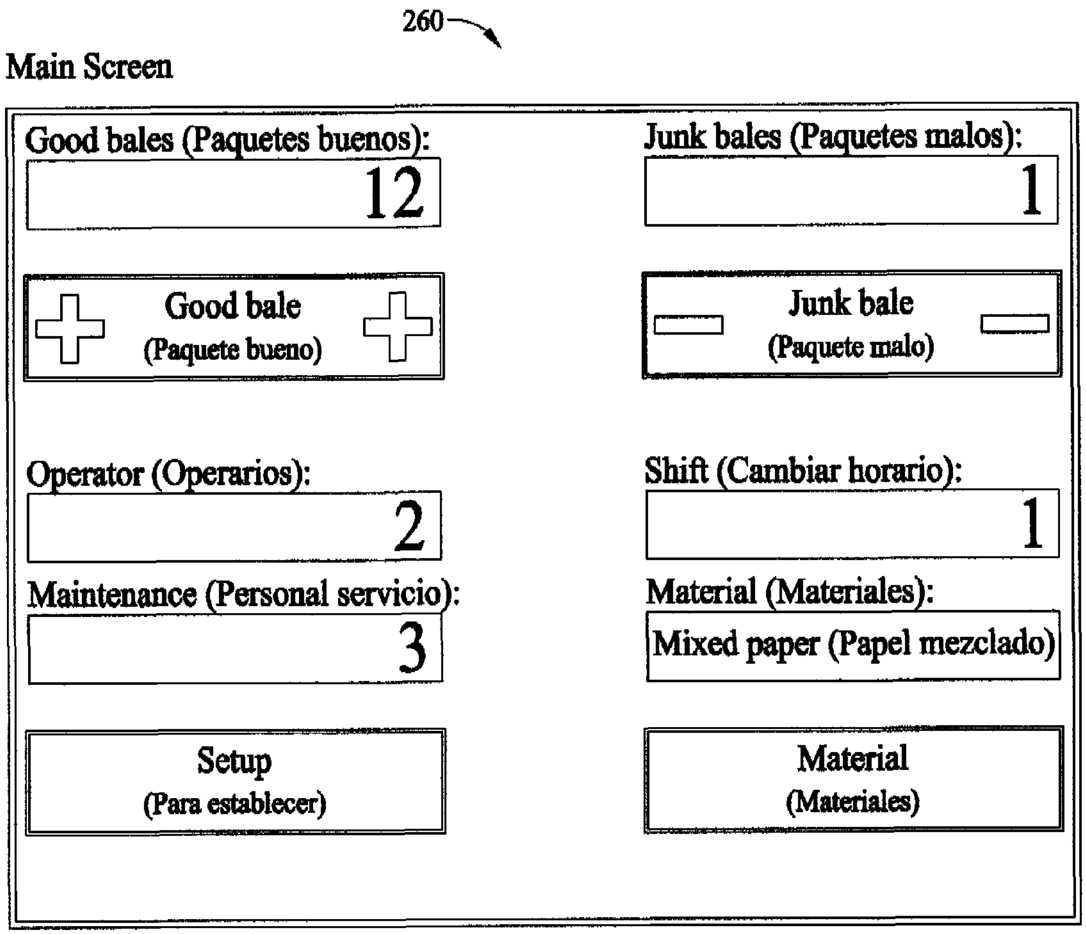
Figure 12:
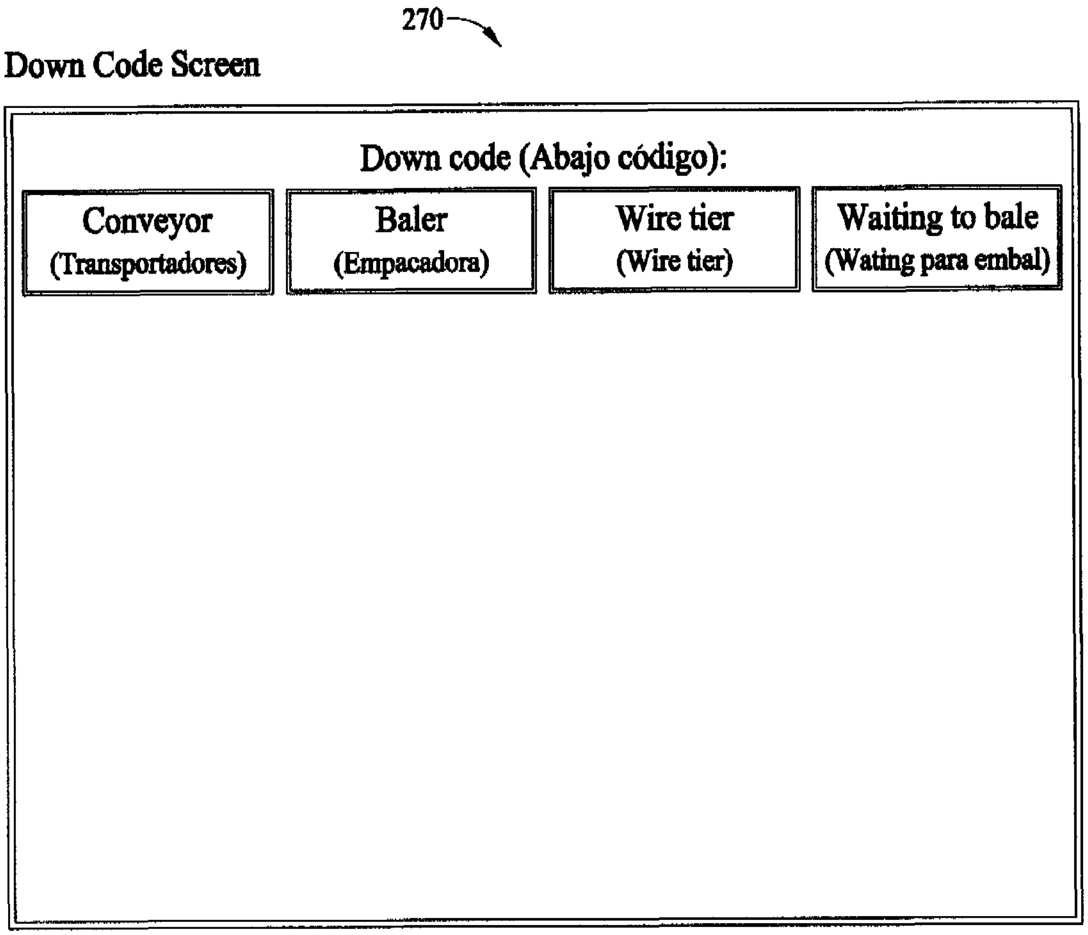

The main screen 260 shown in FIG. 11 will remain displayed to the operator until a downtime condition is detected. Once a downtime condition is detected, an alarm may be generated as described previously, and a downtime category screen 270 shown in FIG. 12 is presented to the operator. The downtime category screen 270 includes four different general downtime categories of machine-related and human-related downtime conditions. In the example shown in FIG. 12, the categories are represented by a "Conveyor" area, a "Baler" area, a "Wire tier" area, and a "Waiting to bale" area, with each area bordered by a block outline in FIG. 12. By pressing one of the downtime category areas in the screen 270, the operator makes a corresponding input to identify a downtime condition to the monitoring interface. In other embodiments, greater or fewer downtime category areas may be provided. By pressing one of the downtime category areas, the screens shown in FIGS. 13-16 are presented that allow more specific inputs regarding downtime conditions. As such, the monitoring interface may be provided with an actual cause, and also record a duration of a downtime condition.

Figure 13:
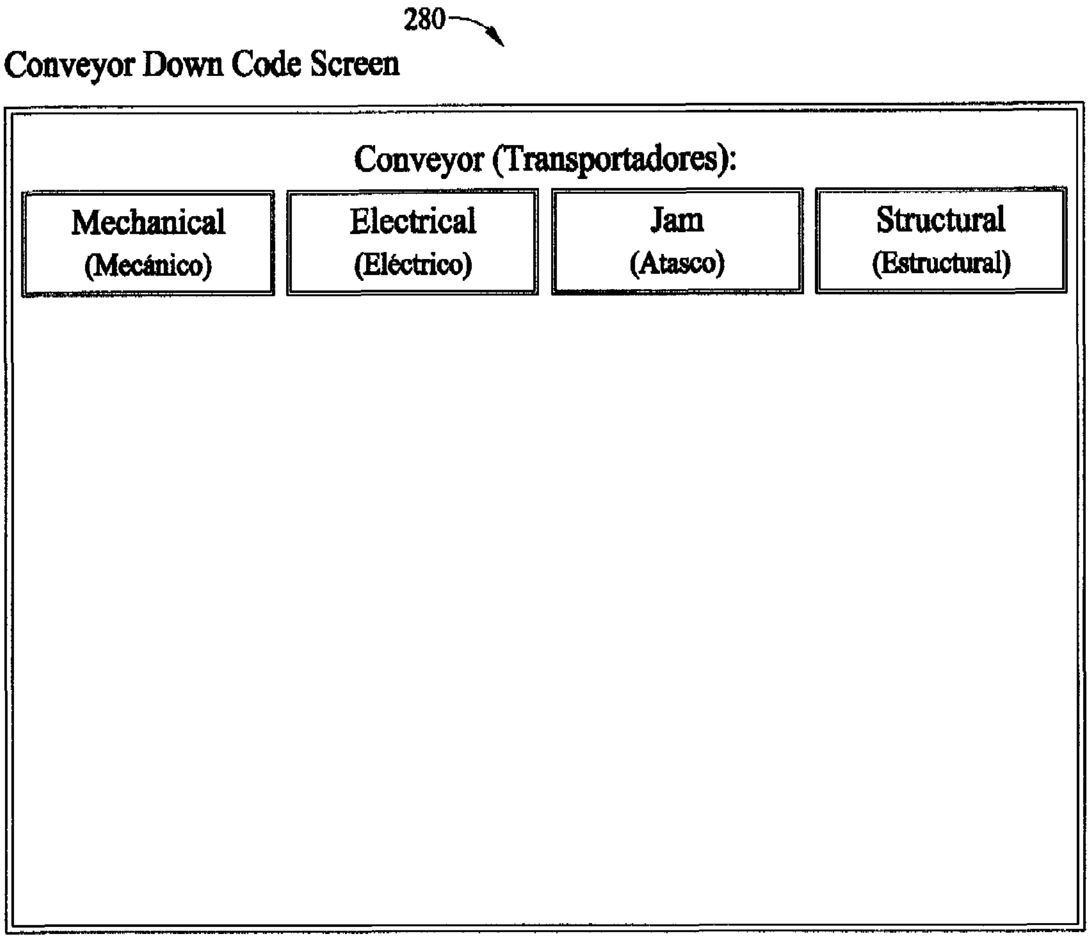

FIG. 13 is a conveyor downtime screen 280 that is presented when the operator selects the conveyor area in the screen shown in FIG. 12. In the example shown in FIG. 13, the conveyor downtime categories are represented by a "Mechanical" area, an "Electrical" area, a "Jam" area, and a "Structural" area, with each area bordered by a block outline in FIG. 13. By pressing one of the conveyor downtime areas in the screen 280, the operator makes a corresponding input to identify a specific conveyor downtime condition to the monitoring interface. In other embodiments, greater or fewer conveyor downtime areas may be provided. By tracking and recording such specific downtime events related to the conveyor, problems with the conveyor system may be diagnosed and troubleshooted, and factored into the performance analysis.

Figure 14:
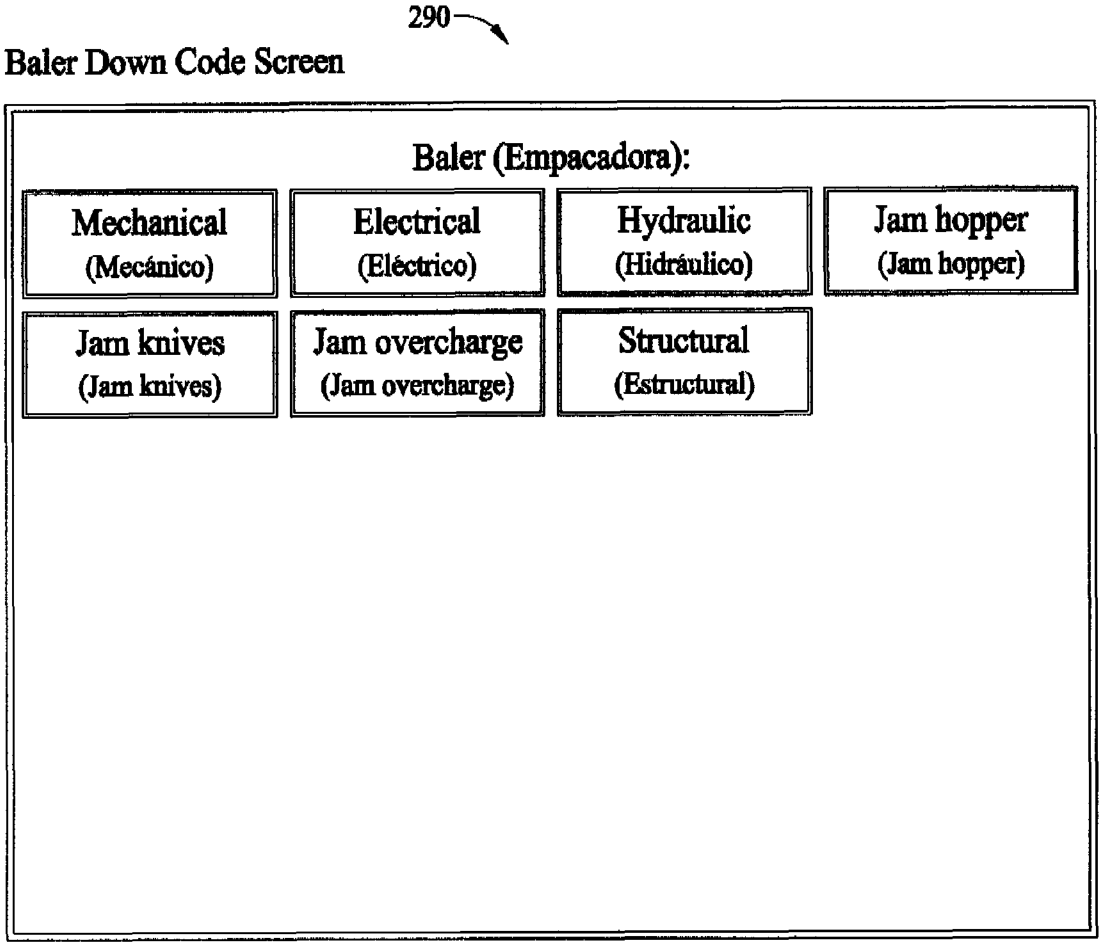

FIG. 14 is a baler downtime screen 290 that is presented when the operator selects the baler area in the screen shown in FIG. 12. In the example shown in FIG. 14, the baler downtime categories are represented by a "Mechanical" area, an "Electrical" area, a "Hydraulic" area, a "Jam Hopper" area, a "Jam Knives" area, a "Jam Overcharge" area, and a "Structural" area, with each area bordered by a block outline in FIG. 14. By pressing one of the baler downtime areas in the screen 290, the operator makes a corresponding input to identify a specific baler downtime condition to the monitoring interface. In other embodiments, greater or fewer baler downtime areas may be provided. By tracking and recording such specific downtime events related to the baler, issues or problems with the conveyor system may be diagnosed and if possible corrected, as well as factored into the performance analysis.

Figure 15:
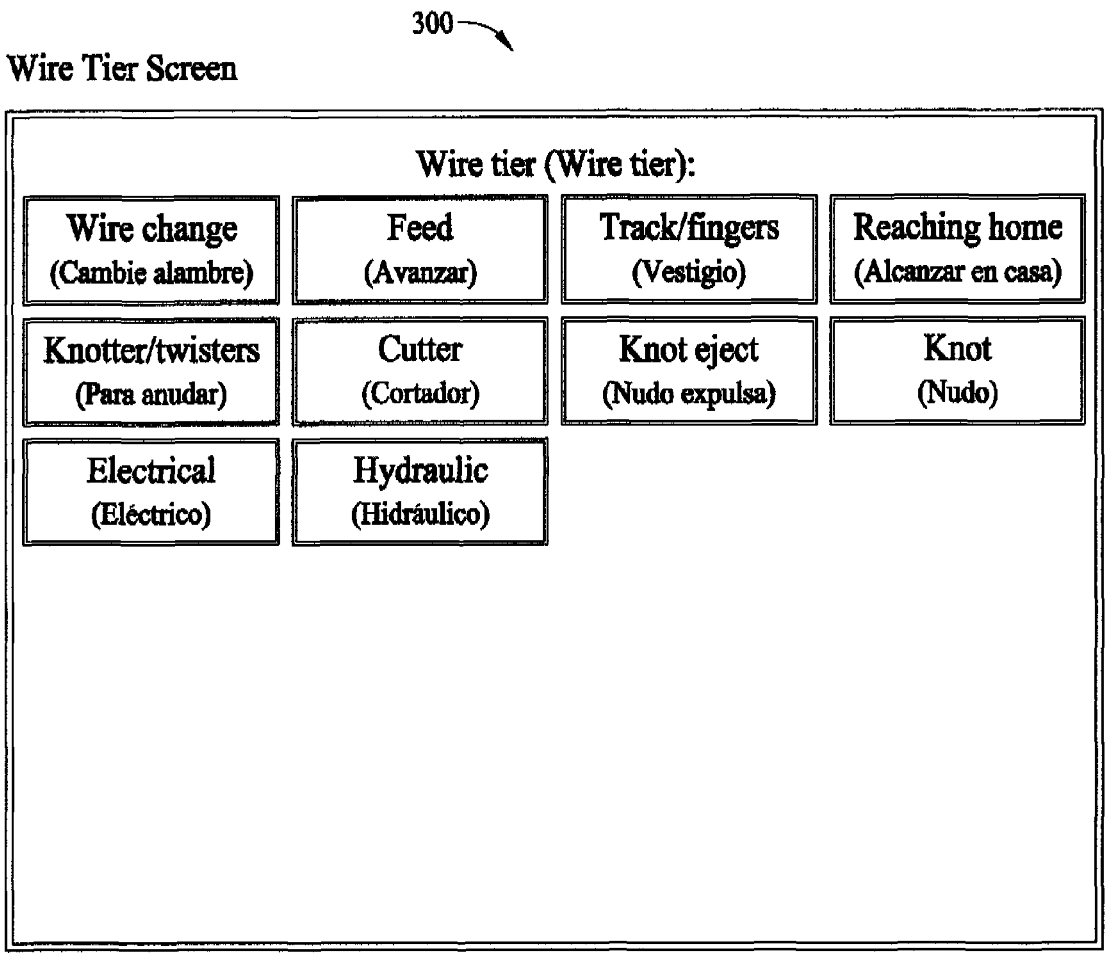

FIG. 15 is a wire tier downtime screen 300 that is presented when the operator selects the wire tier area in the screen shown in FIG. 12. In the example shown in FIG. 15, the wire tier downtime categories are represented by a "Wire change" area, a "Feed" area, a "Tack/Fingers" area, a "Reaching home" area, a "Knotters/twisters" area, a "Cutter" area, a "Knot eject" area, a "Knot" area, an "Electrical" area, and a "Hydraulic" area, with each area bordered by a block outline in FIG. 15. By pressing one of the wire tier downtime areas in the screen 300, the operator makes a corresponding input to identify a specific wire tier condition to the monitoring interface. In other embodiments, greater or fewer wire tier downtime areas may be provided. By tracking and recording such specific downtime events related to the wire tier components, issues or problems with the wire tier components may be diagnosed and if possible corrected, as well as factored into the performance analysis.

Figure 16:
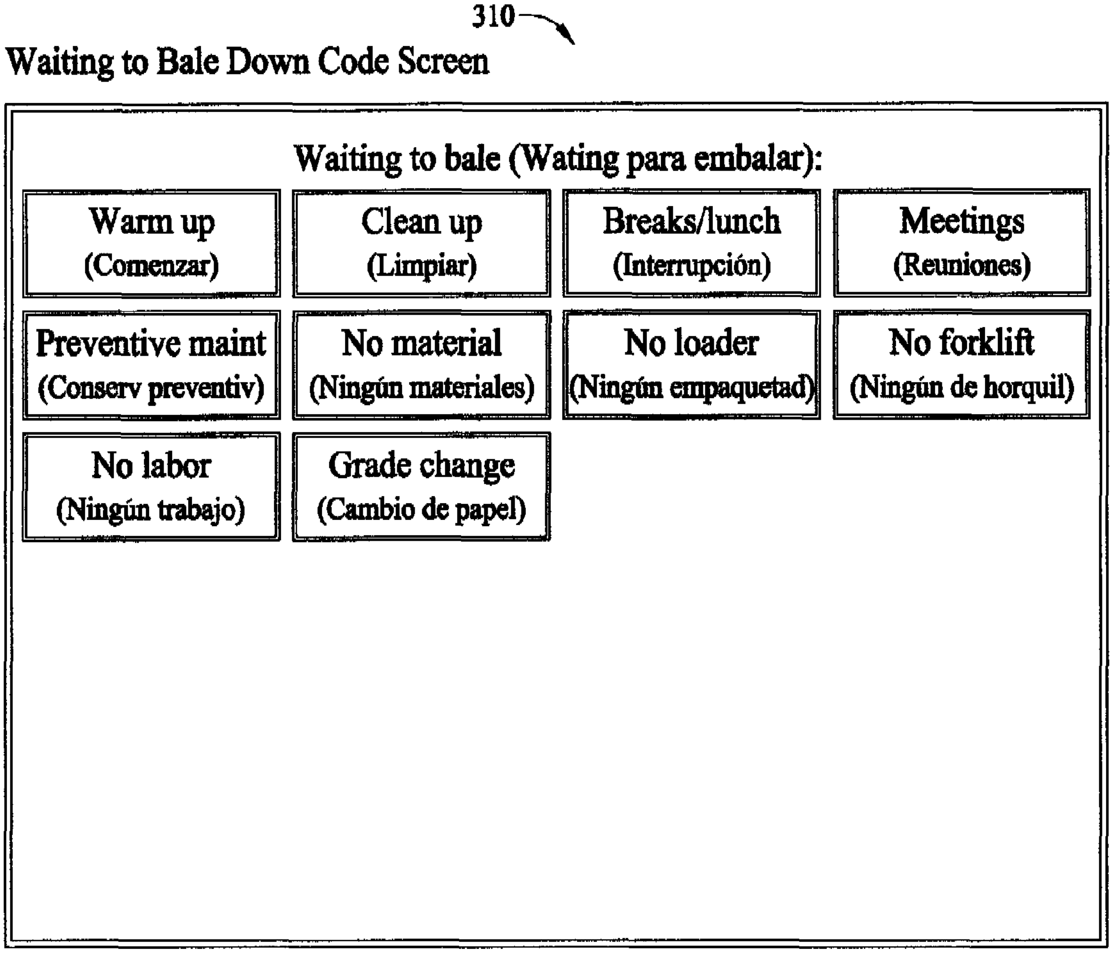

FIG. 16 is a waiting to bale downtime screen 310 that is presented when the operator selects the waiting to bale area in the screen shown in FIG. 12. In the example shown in FIG. 16, the waiting to bale downtime areas include a mixture of machine-related factors and human-related factors. Specifically, in an exemplary embodiment the waiting to bale areas include a "Warm up" area, a "Clean up" area, a "Breaks/lunch" area, a "Meetings" area, a "Preventative Maintenance" area, a "No material" area, a "No loader" area, a "No forklift" area, a "No labor" area, and a "Grade Change" area, with each area bordered by a block outline in FIG. 16. By pressing one of the waiting to bale downtime areas in the screen 310, the operator makes a corresponding input to identify a specific waiting to bale condition to the monitoring interface. In other embodiments, greater or fewer waiting to bale downtime areas may be provided. By tracking and recording such specific downtime events relating waiting to bail conditions, issues or problems in these areas may be diagnosed and if possible corrected, as well as factored into the performance analysis.

The user interface display screens shown in FIGS. 7-16 may be implemented conventionally in a computer program embodied on a computer readable medium and having segments of code or instructions executed by a computer that correspond to the various functions and features described above. Using the screens shown in FIGS. 7-16, a wealth of information regarding baler machine runtime and downtime conditions is gathered for purposes of evaluating performance baselines and assessing performance as described in the methodology set forth above. Equipment issues and personnel issues may be capably monitored and rather comprehensively evaluated.

FIGS. 17A-17D illustrate exemplary pages of a contemplated report and analysis data produced by the performance interface 134 shown in FIG. 3 or the interface 150 shown in FIGS. 4 and 5 using data collected from the monitoring interface 120 (FIG. 3).

FIG. 17A through 17D represent an exemplary baler machine production report 320 for multiple baler machines in various facilities. As shown in FIGS. 17A, 17B, 17C and 17D, the report 320 is provided in multi-column format and includes four general sections, namely a plant information section 322, a production summary section 324, a downtime detail section 326, and a downtime category section 327. Additional or fewer sections may be provided in alternative embodiments, with each row corresponding to data from different machines of the same or different types.

In the illustrated example, the plant information section includes a plant name column 328, a region column 330, and a baler type column 332 for each machine included in the report. Additional or different columns could likewise be provided in the plant information column. While twenty eight different rows are provided corresponding to twenty eight different machines included in the report, it is understood that greater or fewer number of machines, including a single machine, could be included in the report.

The production summary section 324 includes a series of columns including data for each respective baler machine. As shown, the exemplary production summary section includes a total scheduled hours column 334, a column 336 indicating percentage of total scheduled hours that result in machine downtime, a column 338 indicating total actual tons of baled material per scheduled hour, a column 340 including baseline tons per schedule hour, an over/under column 342 for deviation between total actual tons per hour and baseline tons per hour, a column 344 including total actual tons per production hour, a column 346 setting forth actual tons per production hour of a first bale material (OCC), a column 348 including optimal baseline value for tons of the first bale material per production hour, a column 350 including over/under deviation from the actual OCC tons per hour and optimal baseline OCC tons per hour, a column 352 setting forth actual tons per production hour of a second bale material (newspaper), a column 354 including optimal baseline value for tons of the second bale material per production hour, and a column 356 including over/under deviation from the actual newspaper tons per hour and optimal baseline newspaper tons per hour. Additional, fewer, or different columns could likewise be provided in the production summary section 324.

The downtime detail section 326 of the report 320 may include, as shown in FIG. 17B, a break column 358, a lunch column 360 a meeting column 362, a baler mechanical column 364, a baler electrical column 364, a baler hydraulic column 368, a wire feed problems column 370, a wire tying problem column 372, a wire change column 374, a conveyor 1 mechanical problem column 376, a conveyor 1 electrical column 378, a conveyor 2 mechanical problem column 380, a conveyor 2 electrical problem 382, an N/A catch all column 384 for downtime conditions not captured by the proceeding columns, a gatherer overcharge column 386, a warm up time column 388, a no material to baler column 390, a paper grade change time column 392, a paper jam on conveyor column 394, a paper jam in hopper column 396, a paper jam at knives column 398, a clean up time column a daily preventative maintenance column 402, a weekly preventative maintenance column 404, a monthly preventative maintenance column 406, a quarterly preventative maintenance column 408, a miscellaneous column 410, a non-accountable column 412, and a total column 414 summing the preceding downtime columns. Additional, fewer, or different columns could likewise be provided in the downtime detail section 326.

The downtime categories section 327 may include, as shown, a conveyor column 416, a baler column 418, a wire tier column 420, a waiting to bale column 422 and a total column 424.

The columns in each of the sections 322, 324, 326 and 327 are populated by the performance interface, and the report 320 may generated periodically or on demand by interested parties. As examples, reports may be generated daily, weekly, monthly, quarterly, or yearly. The reports may be customized to have varying levels of detail for review by different parties. The reports may be automatically faxed, emailed, printed, or otherwise provided to authorized parties. Similar reports may be generated including data for one machine only rather than a plurality of machines.

The reports may additionally be highlighted or otherwise formatted to identify particular issues. For example, machines deviating below baseline values by a predetermined amount may be differentiated in style (e.g. bold, italics, different font types, etc.) or by a different color (e.g., red) from the color (e.g., black) of the rest of the report. Thus, problem areas may automatically flagged to gain attention by persons reviewing the report. More than one technique of the same or different kind to that described above may likewise be employed to garner attention to different issues.

A number of advantages flow from such a report 320, many of which are believed to be evident from FIGS. 17A-17D. The performance of individual machines or groups of machines can quickly and consistently be assessed to see if they are performing above or below baseline values in various aspects of operation. Multiple queries may be run and reports generated to focus on different aspects of baler machine performance, different groups of machines, different plants, etc. and reports may be custom-tailored for different users.

Using such a report 320, the machines may also be compared to one another to reveal irregularities that may require investigation, such as a machine that is consistently underperforming its peers in one or more areas of evaluation, or machines having an excessive downtime in particular areas that other machines are not exhibiting. Strategic planning is also facilitated as production output of different machines of different manufacturers can be compared to see which better serves the needs of a facility in terms of output, reliability, and expense. Such considerations are very difficult to appreciate, if they could be appreciated at all, without the monitoring interfaces and performance interfaces as described.

Figure 18:
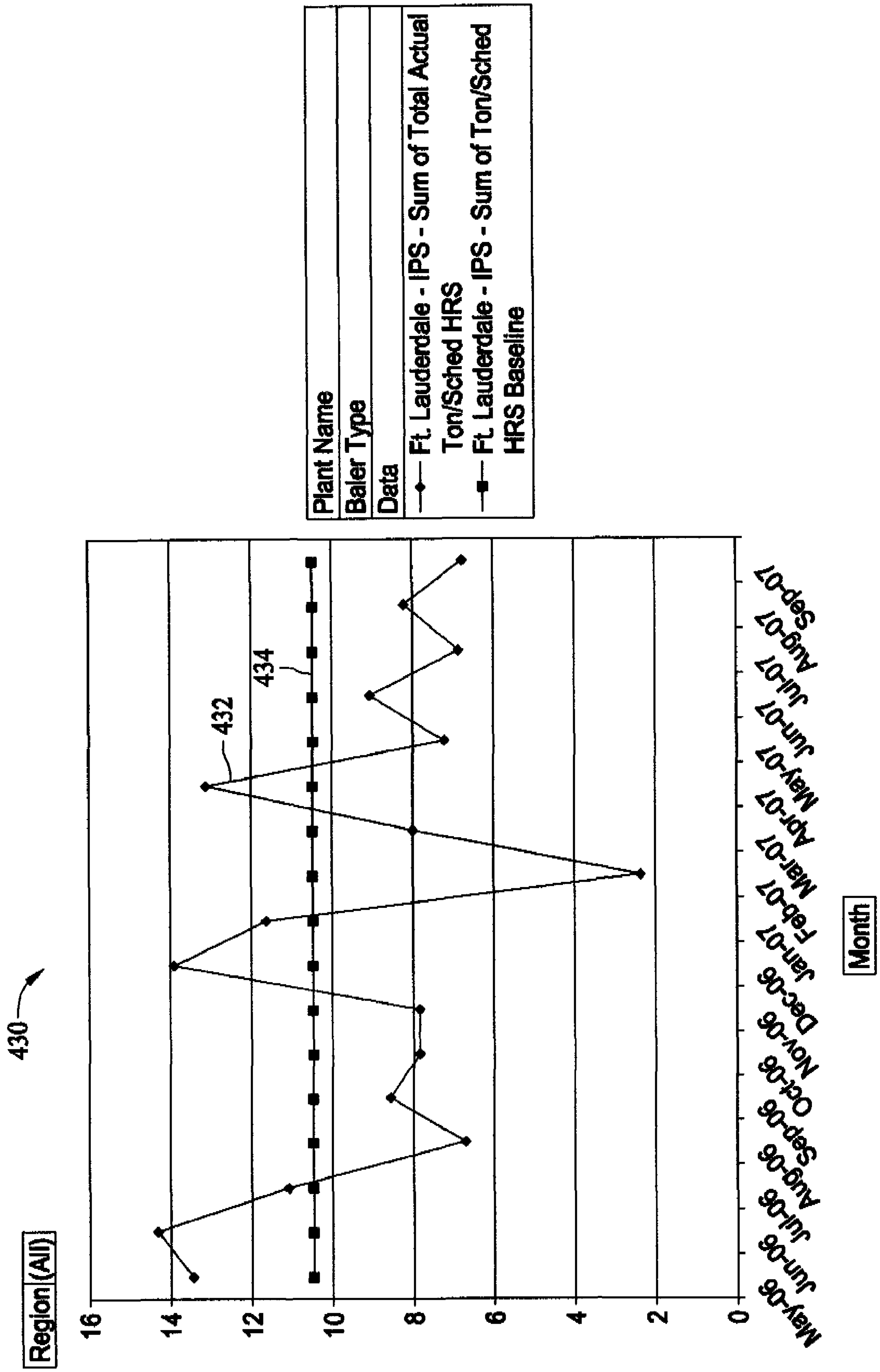

FIG. 18 is a representative baseline comparison chart 430 for a single baler machine, illustrating actual performance over time of a baler machine in one aspect (e.g., total actual tons baled per scheduled hour), plotted with line 432 to its corresponding baseline performance value plotted as line 434. Corrective action may be taken, if possible, to bring the two plotted lines 432 and 434 closer to convergence.

Figure 19:
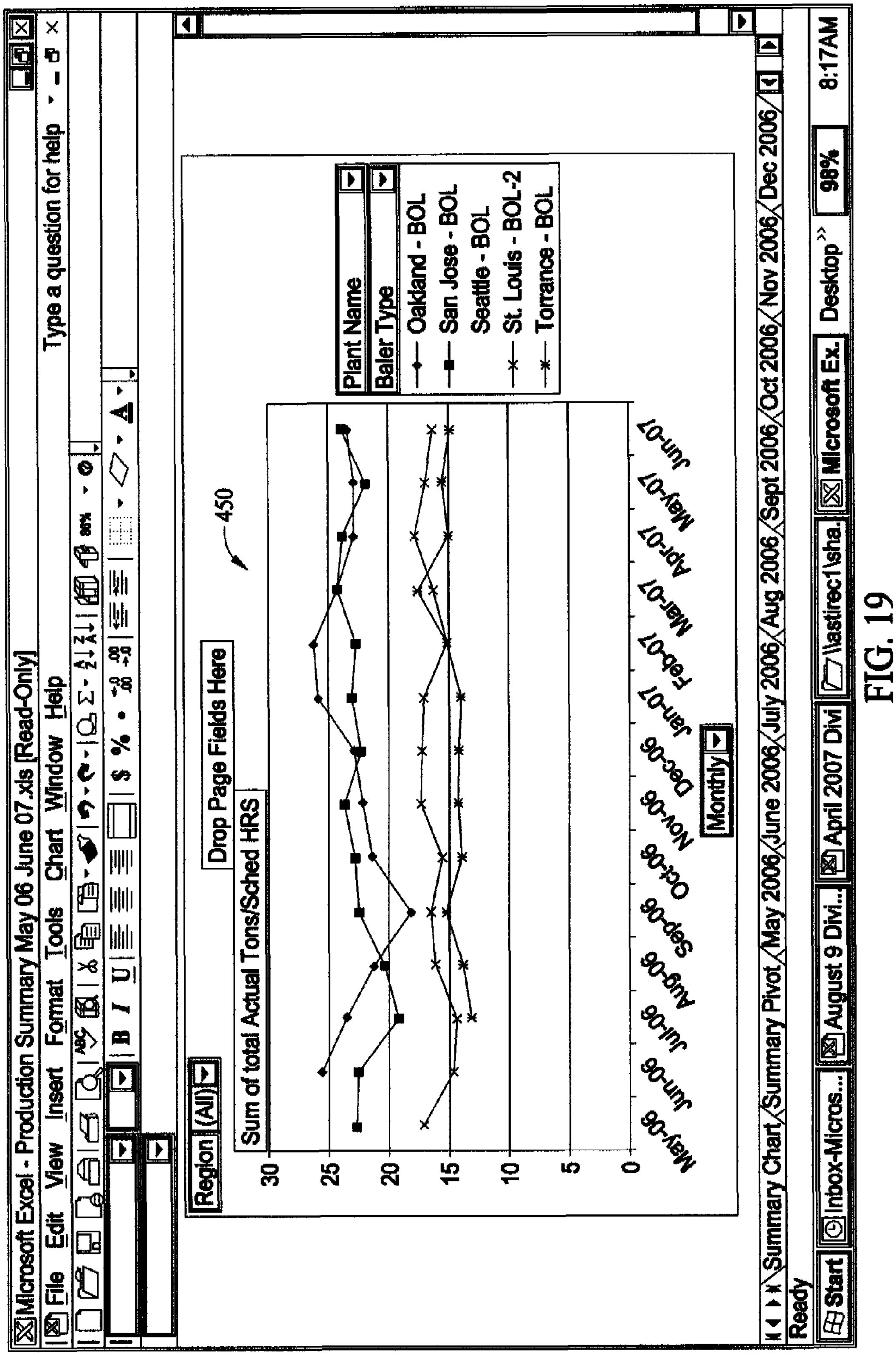

FIG. 19 is a representative baler machine comparison chart 450 for a group of baler machines that each correspond to one of the plotted lines in the graph. Such a graph can be particularly revealing in circumstances wherein otherwise similar or identical machines are observed to exhibit greatly varying production characteristics. In particular, such a circumstance may reveal human-related issues in operating the baler machines, including but not limited to operation of a machine at sub-optimal settings. Such a situation is extremely difficult to detect without the monitoring interfaces and performance interfaces described.

Still other graphical charts could be provided to aid persons from having to review large amounts of data to draw similar conclusions.

While exemplary displays and reports have been described, it is understood that additional segments of code corresponding to additional tables, displays, links, graphics, information, and indicia may be provided in further embodiments, and further that not all of the exemplary information provided in the above-described displays, screens, and reports need be used in some embodiments of the invention. The displays and reports may be varied to suit the needs of specific equipment, installations and users.

When the displays and reports are implemented with a network-based system as described above, the system may flexibly present information and perform analysis of baler machine data collection and performance installation through menu-driven graphical displays and information links. System users may quickly access needed information to properly manage and reliably evaluate the performance of complicated and expensive baler machines. Detailed reports may likewise be saved on the system for further study and analysis.

V. System Adaptations

The systems and processes described above are not limited to the specific embodiments described herein. Components of each interface and each process can be practiced independent and separate from other components and processes described herein. Each component and process also can be used in combination with other components, systems and processes.

Additionally, in further embodiments, the performance interfaces could be used to virtually model other configurations of machines and facilities, using data collected from existing facilities and machines for strategic planning purposes. The interfaces may also be configured in further embodiments to forecast or predict performance outputs and downtime issues, as well as proactively recommend procedures to avoid future problems. Analysis of collected data may reveal, for example, that certain machines functioning at certain settings are more prone to downtime than when used at other settings, and accordingly recommend that certain settings be avoided or used sparingly. The collected data may also reveal, as another example, that certain types of conveyors are less prone to downtime than others, or that certain wire tiers are more beneficial than others.

The interfaces could likewise intelligently deduce that outputs may be increased or downtime may be decreased if certain actions are taken, and recommend improvements to optimize baler machine operations. That is, the interfaces may intelligently perform diagnostic analysis, identify issues to interested parties, and recommend solutions or actions to be taken to improve performance.

Such real-world data collected from the baler machines in extended use could also provide invaluable feedback to baler machine manufacturers. That is, baler machines could be designed to avoid issues with existing machines that the data may reveal.

While the foregoing methods, monitoring and performance interfaces have been described in relation to baling machines for various materials, it is contemplated that such methods, monitoring and performance interfaces may be extended to sorting systems for a variety of different materials either in connection with or separate from a baling machine.

VI. Conclusion

The benefits and advantages of the invention are now believed to be amply demonstrated in the various embodiments disclosed.

While the invention has been described in terms of various specific embodiments, those skilled in the art will recognize that the invention can be practiced with modification within the spirit and scope of the claims.

What is claimed is:

1. A monitoring interface for evaluating a production performance of at least one baler machine, the monitoring interface comprising:

at least one sensor device detecting a downtime condition of the baler machine;

a controller interfaced with the at least one sensor device and configured to record data associated with the detected downtime conditions, the recorded downtime data including at least a duration of time between detection of the downtime condition and re-starting the baler machine; and an input device coupled to the controller and configured to:

accept user-provided runtime data inputs regarding runtime operation of the baler machine, the runtime data inputs including at least a material type input, an acceptable bale input, and an unacceptable bale input; and accept user-provided downtime data inputs regarding a downtime of the baler machine after the downtime condition is detected, the downtime data inputs including at least a specific cause of the downtime condition, wherein the controller is configured to communicate the recorded data and accepted data inputs to a computer-implemented performance interface for generation of a production report.

2. The monitoring interface of claim 1, wherein the controller is configured to trigger an alarm condition in response to predetermined signals from the at least one sensor device.

3. The monitoring interface of claim 2, further comprising an alarm beacon activated by the controller in the alarm condition.

4. The monitoring interface of claim 1, wherein the baler machine is fed bale material by a conveyor, and the at least one sensor device comprises one of a conveyor motor sensor and a conveyor eye sensor.

5. The monitoring interface of claim 1, wherein the input device comprises a touch sensitive display.

6. The monitoring interface of claim 1, wherein the input device comprises a keyboard.

7. The monitoring interface of claim 1, wherein the input device comprises a display, the data inputs selected from the display.

8. The monitoring interface of claim 7, wherein the input device is further configured to receive at least one of an operator identification input, a shift input, a maintenance person input from a user as the runtime data inputs.

9. The monitoring interface of claim 7, wherein the input device is further configured to receive at least one of a material type input including one of an corrugated cardboard (OCC) type input, a paper input, a fiber input, a plastic input, and a metal input from a user as the runtime data inputs.

10. The monitoring interface of claim 1, wherein the input device is further configured to accept at least one of a conveyor input, a baler input, a wire tier input, and a waiting to bale input as the downtime data inputs.

11. The monitoring interface of claim 10, wherein the input device is configured to accept at least one of a mechanical downtime input, an electrical downtime input, a jam downtime input, and a structural downtime input as the conveyor input.

12. The monitoring interface of claim 10, wherein the input device is configured to accept at least one of a mechanical downtime input, an electrical downtime input, a hydraulic downtime input, a jam knives downtime input, a jam overcharge input, and a structural downtime input as the baler input.

13. The monitoring interface of claim 10, wherein the input device is configured to accept at least one of a wire change downtime input, a feed downtime input, a track/fingers downtime input, a reaching home downtime input, a knotter/twister downtime input, a cutter downtime input, a knot eject downtime input, a knot downtime input, an electrical downtime input, and a hydraulic downtime input as the wire tier input.

14. The monitoring interface of claim 10, wherein the input device is configured to accept at least one of a warm up input, a clean up input, a breaks/lunch input, a meetings input, a preventive maintenance input, a no material input, a no loader input, a no forklift input, a no labor input, and a grade change input as the waiting to bale input.

15. A computer-implemented method of evaluating a production performance of at least one baler machine for producing bales of material, the at least one baler machine including a local monitoring interface communicating with a remotely located computer-based performance interface, the method comprising:

collecting, using the monitoring interface, downtime and runtime data for the at least one baler machine, the runtime data including at least acceptable bale production data, the downtime data including at least a duration of time between detection of a downtime condition and re-starting the baler machine and a user-provided cause of the downtime condition;

comparing at least one of the collected downtime data and the collected runtime data to a predetermined baseline performance value; and generating a production report identifying a difference between the collected data and the baseline performance value.

16. The method of claim 15, further comprising establishing at least one baseline performance value for the at least one baler machine.

17. The method of claim 16, wherein establishing at least one baseline performance value comprises collecting runtime data over a predetermined time, and averaging the collected runtime data to establish the baseline performance value.

18. The method of claim 17, wherein establishing at least one baseline performance value further comprises establishing at least one baseline performance value that includes a target tons per hour of baled material produced by the at least one baler machine.

19. The method of claim 15, further comprising communicating the collected downtime and runtime data to the remotely located computer-based performance interface.

20. The method of claim 15, wherein the at least one baler machine comprises a plurality of baler machines each having a respective monitoring interface, the method further comprising:

receiving, with the remotely located computer-based performance interface, runtime data and downtime data from each of the respective monitoring interfaces; and assimilating the data from each of the plurality of machines into the production report.

21. The method of claim 20, wherein generating the production report further includes comparing the data from the plurality of baler machines to one another.

22. The method of claim 15, wherein collecting the downtime data comprises:

sensing a downtime condition of the at least one baler machine; and recording information regarding the sensed downtime condition.

23. The method of claim 15, wherein collecting runtime data comprises accepting data and information being input by a human operator of the at least one baler machine while the at least one baler machine is operating.

24. The method of claim 15, further comprising:

presenting, using the monitoring interface, runtime data inputs and downtime data inputs to a user of the at least one baler machine; and accepting user-selected inputs from the presented runtime data inputs.

25. The method of claim 24, wherein presenting runtime data inputs and downtime data inputs further comprises presenting at least one of an operator identification input, a shift input, and a maintenance person input as the presented runtime data inputs.

26. The method of claim 24, wherein presenting runtime data inputs and downtime data inputs further comprises presenting material type inputs including at least one of a corrugated cardboard (OCC) type input, a paper input, a fiber input, a plastic input, and a metal input as the presented runtime data inputs.

27. The method of claim 24, wherein presenting runtime data inputs and downtime data inputs further comprises presenting at least one of a conveyor input, a baler input, a wire tier input, and a waiting to bale input as the presented downtime data inputs.

28. The method of claim 27, wherein presenting a conveyor input comprises presenting at least one of a mechanical downtime input, an electrical downtime input, a jam downtime input, and a structural downtime input.

29. The method of claim 27, wherein presenting a baler input comprises presenting at least one of a mechanical downtime input, an electrical downtime input, a hydraulic downtime input, a jam knives downtime input, a jam overcharge input, and a structural downtime input.

30. The method of claim 27, wherein presenting a wire tier input comprises presenting at least one of a wire change downtime input, a feed downtime input, a track/fingers downtime input, a reaching home downtime input, a knotter/twister downtime input, a cutter downtime input, a knot eject downtime input, a knot downtime input, an electrical downtime input, and a hydraulic downtime input.

31. The method of claim 27, wherein presenting a waiting to bale input comprises presenting at least one of a warm up input, a clean up input, a breaks/lunch input, a meetings input, a preventive maintenance input, a no material input, a no loader input, a no forklift input, a no labor input, and a grade change input.

32. The method of claim 20, further comprising generating an alarm during a downtime condition.

33. A network-based system for monitoring and evaluating production performance of a plurality of baler machines in various reclamation facilities, the system comprising:

a monitoring interface local to each of the plurality of baler machines, each monitoring interface configured to collect downtime data and runtime data for each respective baler machine, the downtime data including at least a duration of time between detection of a downtime condition and re-starting the respective baler machine and a user-provided cause of the downtime condition; and a performance interface configured to receive the downtime data and runtime data from each monitoring interface, the performance interface comprising a database for storing information and a server system coupled to the database, the server system configured to:

receive the downtime data and runtime data from the monitoring interfaces;

compile the received downtime data and runtime data; and generate a production report identifying operating trends for each of the plurality of baler machines to compare the plurality of baler machines to one another.

34. The system of claim 33, wherein the server system is further configured to identify an underperforming baler machine based on the received data.

35. The system of claim 33, wherein the server system is further configured to establish performance values for each of the plurality of baler machines based on the received data.

36. The system of claim 33, wherein the server system is further configured to send the production reports to responsible personnel.

37. The system of claim 33, wherein the server system is further configured to send the production reports via one of facsimile or email.

38. The system of claim 33, wherein the server system is further configured to periodically generate the production reports.

39. The system of claim 33, wherein the server system is further configured to archive the received runtime and downtime data.

* * * * *